(12) United States Patent  (10) Patent No.: US 12,281,503 B2
Peterson et al.  (45) Date of Patent: Apr. 22, 2025

(54) VEHICULAR EXTERIOR DOOR HANDLE ASSEMBLY

(71) Applicant: Magna Mirrors of America, Inc., Holland, MI (US)

(72) Inventors: Kenneth C. Peterson, Ada, MI (US); Justin E. Sobecki, Rockford, MI (US)

(73) Assignee: Magna Mirrors of America, Inc., Holland, MI (US)

(*) Notice: Subject to any disclaimer, the term of this patent is extended or adjusted under 35 U.S.C. 154(b) by 0 days.

(21) Appl. No.: 18/389,911

(22) Filed: Dec. 20, 2023

(65) Prior Publication Data

US 2024/0125154 A1   Apr. 18, 2024

Related U.S. Application Data

(62) Division of application No. 17/302,186, filed on Apr. 27, 2021, now Pat. No. 11,851,920.

(Continued)

(51) Int. Cl.
*E05B 81/76* (2014.01)
*B60Q 3/267* (2017.01)
(Continued)

(52) U.S. Cl.
CPC ............. *E05B 81/77* (2013.01); *B60Q 3/267* (2017.02); *B60R 25/2045* (2013.01); *E05B 85/18* (2013.01)

(58) Field of Classification Search
CPC .......... E05B 81/76; E05B 81/77; E05B 85/10; E05B 85/103; E05B 85/14; E05B 85/18;
(Continued)

(56) References Cited

U.S. PATENT DOCUMENTS 5,371,659 A   12/1994   Pastrick et al.
5,497,305 A   3/1996   Pastrick et al.
(Continued)

FOREIGN PATENT DOCUMENTS

DE   102017126077 A1 *   6/2018   ............ B60R 21/01
EP   2032783 A1   3/2009
(Continued)

OTHER PUBLICATIONS

Numbered Paragraphs version of WO2015148788 (Year: 2015).*
Infrared Sensor How it Works (Year: 2018).*
Numbered Paragraphs version of WO2015148788 (Year: 2015).

*Primary Examiner* — Matthew Troutman
*Assistant Examiner* — Christopher F Callahan
(74) *Attorney, Agent, or Firm* — HONIGMAN LLP

(57) ABSTRACT

A vehicular exterior door handle assembly includes a base portion configured to mount at an exterior door handle region of a vehicular door, a handle portion, and a sensing device operable to sense presence of a person's fingers in a pocket region behind the lower portion of the handle. The handle portion is pivotable between a non-deployed orientation, where an outer surface of the handle portion is coplanar with an outer surface of the vehicular door at the exterior door handle region, and a deployed orientation, where the handle portion is pivoted inward into a door handle pocket within the vehicular door. With the handle in the deployed orientation and when a person's fingers are in the pocket region, the sensing device senses presence of the person's fingers at the pocket region and triggers an actuator of the vehicular exterior door handle assembly to unlatch the vehicular door.

34 Claims, 17 Drawing Sheets

Related U.S. Application Data

(60) Provisional application No. 62/706,574, filed on Aug. 26, 2020, provisional application No. 62/704,216, filed on Apr. 28, 2020.

(51) Int. Cl.
   *B60R 25/20* (2013.01)
   *E05B 85/18* (2014.01)

(58) Field of Classification Search
   CPC ........ E05B 17/10; E05B 81/06; Y10T 292/57; B60Q 3/267; B60R 25/2045
   See application file for complete search history.

(56) References Cited

U.S. PATENT DOCUMENTS

| | | | |
|---|---|---|---|
| 5,669,699 A | 9/1997 | Pastrick et al. | |
| 5,671,996 A | 9/1997 | Bos et al. | |
| 5,823,654 A | 10/1998 | Pastrick et al. | |
| 5,938,321 A | 8/1999 | Bos et al. | |
| 6,086,229 A | 7/2000 | Pastrick | |
| 6,139,172 A | 10/2000 | Bos et al. | |
| 6,149,287 A | 11/2000 | Pastrick et al. | |
| 6,152,590 A | 11/2000 | Furst et al. | |
| 6,176,602 B1 | 1/2001 | Pastrick et al. | |
| 6,276,821 B1 | 8/2001 | Pastrick et al. | |
| 6,280,069 B1 | 8/2001 | Pastrick et al. | |
| 6,291,905 B1 | 9/2001 | Drummond et al. | |
| 6,349,450 B1 | 2/2002 | Koops et al. | |
| 6,396,408 B2 | 5/2002 | Drummond et al. | |
| 6,416,208 B2 | 7/2002 | Pastrick et al. | |
| 6,477,464 B2 | 11/2002 | McCarthy et al. | |
| 6,550,103 B2 | 4/2003 | Koops et al. | |
| 6,568,839 B1 | 5/2003 | Pastrick et al. | |
| 6,907,643 B2 | 6/2005 | Koops et al. | |
| 6,977,619 B2 | 12/2005 | March et al. | |
| 7,108,301 B2 * | 9/2006 | Louvel | E05B 85/103 292/201 |
| 7,407,203 B2 | 8/2008 | Huizenga et al. | |
| 8,333,492 B2 | 12/2012 | Dingman et al. | |
| 8,701,353 B2 * | 4/2014 | Patel | E05B 85/103 292/201 |
| 8,764,256 B2 | 7/2014 | Foote et al. | |
| 8,786,401 B2 | 7/2014 | Sobecki et al. | |
| 8,801,245 B2 | 8/2014 | De Wind et al. | |
| 9,221,394 B2 * | 12/2015 | Ukai | B60Q 3/64 |
| 9,484,626 B2 | 11/2016 | Dykhouse | |
| 9,518,410 B2 * | 12/2016 | Vasi | E05B 81/08 |
| 9,925,953 B2 | 3/2018 | Pribisic et al. | |
| 10,107,026 B2 | 10/2018 | Dezorzi et al. | |
| 10,533,350 B2 | 1/2020 | Schatz et al. | |
| 10,569,697 B2 | 2/2020 | Huizen et al. | |
| 11,851,920 B2 | 12/2023 | Peterson et al. | |
| 2010/0007463 A1 | 1/2010 | Dingman et al. | |
| 2010/0088855 A1 | 4/2010 | Ruse et al. | |
| 2013/0130674 A1 * | 5/2013 | De Wind | B60Q 1/2669 362/546 |
| 2013/0242586 A1 | 9/2013 | Huizen et al. | |
| 2015/0059424 A1 * | 3/2015 | Hunt | E05B 81/76 292/336.3 |
| 2020/0102773 A1 | 4/2020 | Sobecki | |
| 2020/0130646 A1 | 4/2020 | Peterson | |
| 2021/0293061 A1 | 9/2021 | Blank et al. | |
| 2022/0266796 A1 | 8/2022 | Peterson et al. | |

FOREIGN PATENT DOCUMENTS

| | | | |
|---|---|---|---|
| GB | 2548145 A | 9/2017 | |
| WO | WO-2015148788 A1 * | 10/2015 | E05B 81/06 |

* cited by examiner

VEHICULAR EXTERIOR DOOR HANDLE ASSEMBLY

CROSS REFERENCE TO RELATED APPLICATIONS

The present application is a division of U.S. patent application Ser. No. 17/302,186, filed Apr. 27, 2021, now U.S. Pat. No. 11,851,920, which claims the filing benefits of U.S. provisional application Ser. No. 62/706,574, filed Aug. 26, 2020, and U.S. provisional application Ser. No. 62/704,216, filed Apr. 28, 2020, which are hereby incorporated herein by reference in their entireties.

FIELD OF THE INVENTION

The present invention relates to door handles for vehicles and, more particularly, an exterior door handle for opening a side door of a vehicle responsive to a passive entry device or system.

BACKGROUND OF THE INVENTION

A door handle for a vehicle door typically includes a handle portion that is pivotable relative to a base portion, whereby pivotal movement of the handle portion pulls at a cable or rod to electrically trigger or move a latch mechanism to release the latch and open the door.

SUMMARY OF THE INVENTION

A vehicular exterior door handle assembly is configured to mount at a handle region of a vehicle door. The vehicular exterior door handle assembly comprises a handle portion movably mounted at the handle region of the vehicle door and light projecting and light sensing module. The handle portion is disposed at the handle region and, when not in use, has its outer surface flush with or generally flush or coplanar with the outer surface of the door panel at the handle region. When the handle is moved to a deployed position (such as when a key fob is detected and the handle is ready for an identified user to open the vehicle door), the handle may move inward into the handle region whereby the light projecting module operates to project a logo or icon or the like onto the outer surface of the now retracted handle portion. With the handle retracted, the user can insert his or her hand into the handle's pocket region, whereby the light sensing module senses presence of the user's hand and may sense movement of the user's hand and, responsive to such sensing, actuates the door latch mechanism to open the vehicle door.

Thus, a vehicular exterior door handle assembly includes a base portion configured to mount at an exterior door handle region of a vehicular door. A handle portion is pivotable relative to the base portion. The handle portion, with the base portion mounted at the exterior door handle region of the vehicular door, is pivotable between a non-deployed orientation, where an outer surface of the handle portion is coplanar with an outer surface of the vehicular door at the exterior door handle region, and a deployed orientation, where the handle portion is at least partially accommodated in a door handle pocket of the vehicular door. A light projection device is operable to project an icon or character onto the outer surface of the handle portion when the handle portion is in the deployed orientation. With the handle portion in the deployed orientation, the vehicular door can be opened by a person.

In some implementations, the light projection device projects the icon or character responsive to the handle portion pivoting to the deployed orientation. Optionally, with the base portion mounted at the exterior door handle region of the vehicular door, the light projection device is disposed at an upper portion of the vehicular door handle assembly and, with the handle portion in the deployed orientation, projects the icon or character downward onto the handle portion. The icon or character may include a vehicle logo.

With the handle portion in the deployed orientation, a person's fingers can be partially inserted into the door handle pocket to open the vehicular door. In some implementations, a pocket sensing device detects presence of the person's fingers in the door handle pocket. The pocket sensing device may include a capacitive sensor or a piezoelectric sensor. In some examples, the pocket sensing device includes a plurality of light emitters (e.g., light emitting diodes) and at least one light sensor that detects presence of the person's fingers in the door handle pocket. The pocket sensing device energizes the plurality of light emitting diodes and determines, at the at least one light sensor, a level of light intensity in the door handle pocket (such as via processing an output of the at least one light sensor when the light emitting diodes are energized) to detect presence of the person's fingers in the door handle pocket. The at least one light sensor senses ambient light at the door handle and the pocket sensing device determines whether the determined level of light intensity is within a threshold difference level of the sensed ambient light intensity to detect presence of the person's fingers in the door handle pocket. The pocket sensing device, via episodically energizing individual ones of the plurality of light emitters, determines movement of the person's fingers within the door handle pocket. With the plurality of light emitters at a first side of the door handle pocket, the light sensor is at a second side of the door handle pocket facing the first side.

In some examples, the pocket sensing device includes a plurality of light sensors and at least one light emitter (e.g., at least one light emitting diode) that detect presence of the person's fingers in the door handle pocket. With the plurality of light sensors at a first side of the door handle pocket, the at least one light emitter is at a second side of the door handle pocket facing the first side.

Responsive to detection of the person's fingers in the door handle pocket, the pocket sending device generates an output. The vehicular door is opened responsive to the output. When the pocket sensing device is operable to determine movement of the person's fingers within the door handle pocket, a corresponding function is performed responsive to the determined movement of the person's fingers within the door handle pocket. For example, the corresponding function may be locking or unlocking of the vehicular door.

Another vehicular exterior door handle assembly includes a base portion configured to mount at an exterior door handle region of a vehicular door. A handle is pivotable relative to the base portion. The handle, with the base portion mounted at the exterior door handle region of the vehicular door, is pivotable about a pivot axis that is at and along a central portion of the handle between an upper portion of the handle and a lower portion of the handle. A sensing device is disposed at least partially along the handle and operable to sense presence of a person's fingers in a pocket region behind the lower portion of the handle. With the base portion mounted at the exterior door handle region of the vehicular door, the handle is pivotable between a non-deployed orientation, where an outer surface of the handle is coplanar with an outer surface of the vehicular door at the exterior door handle region, and a deployed orientation, where the lower portion of the handle outward of the outer surface of the vehicular door at the exterior door handle region and the upper portion of the handle is in the pocket region within the vehicular door. With the handle in the deployed orientation, a person's fingers can be inserted into the pocket region at the lower portion of the handle. The handle includes a sensing device that, with the base portion mounted at the exterior door handle region of the vehicular door, and with the handle in the deployed orientation and when the person's fingers are inserted into the pocket region, senses presence of the person's fingers at the pocket region and triggers an actuator of the vehicular door handle assembly to unlatch the vehicular door.

In some examples, the sensing device is disposed within a recess formed along the handle above the pocket region. A potting material is disposed in the recess to encapsulate the sensing device within the recess. With the handle in the non-deployed orientation, the person can pivot the handle to a manually deployed orientation by pushing the upper portion of the handle into the pocket region. With the handle in the manually deployed orientation, the user can pull at the lower portion of the handle to pivot the handle to open the vehicle door.

These and other objects, advantages, purposes and features of the present invention will become apparent upon review of the following specification in conjunction with the drawings.

DESCRIPTION OF THE PREFERRED EMBODIMENTS

Figure 1:
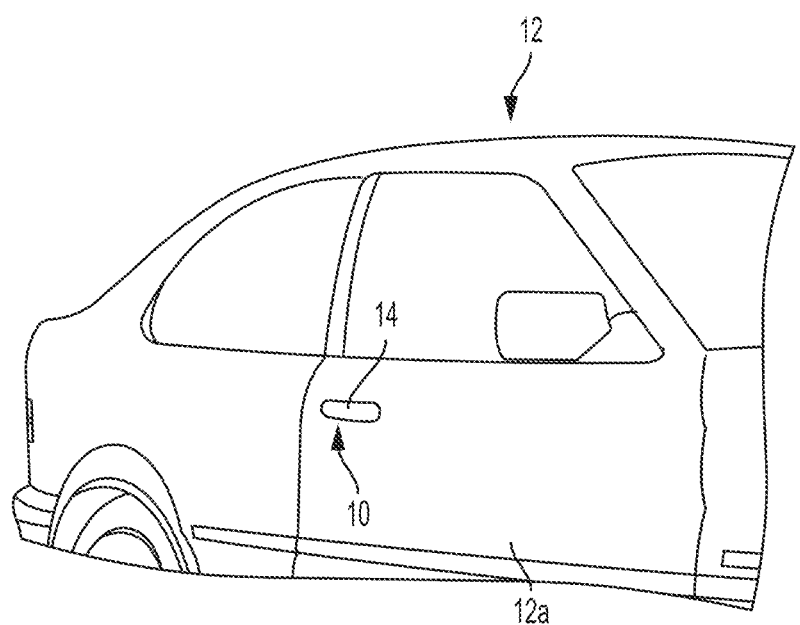
FIG. 1 is a perspective view of a vehicle with a door handle assembly.

Referring now to the drawings and the illustrative embodiments depicted therein, a vehicle door handle assembly 10 is mountable to a door 12a of a vehicle 12 and operable to release a latch mechanism of the door 12a to open the vehicle door (FIG. 1). Vehicle door handle assembly 10 includes a handle portion 14 that is disposed at the door and that is fixedly mounted at the door or to a bracket mounted to the door. The handle portion may be movably mounted at the handle region of the vehicle door (such as pivotally mounted), whereby movement of the handle portion provides access to a door handle pocket region and an input by a user at the door handle pocket region operates a function of the vehicle door handle assembly such as releasing a latch mechanism of the vehicular door so the user can open the vehicle door.

Figure 2:
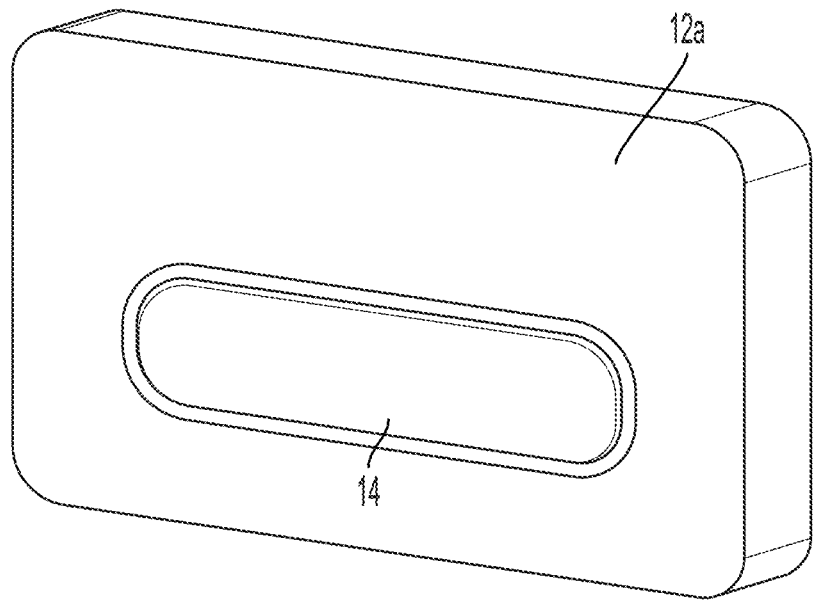
FIG. 2 is a perspective view of a vehicular exterior door handle assembly, with the handle portion in a non-deployed or flush state.
Figure 3:
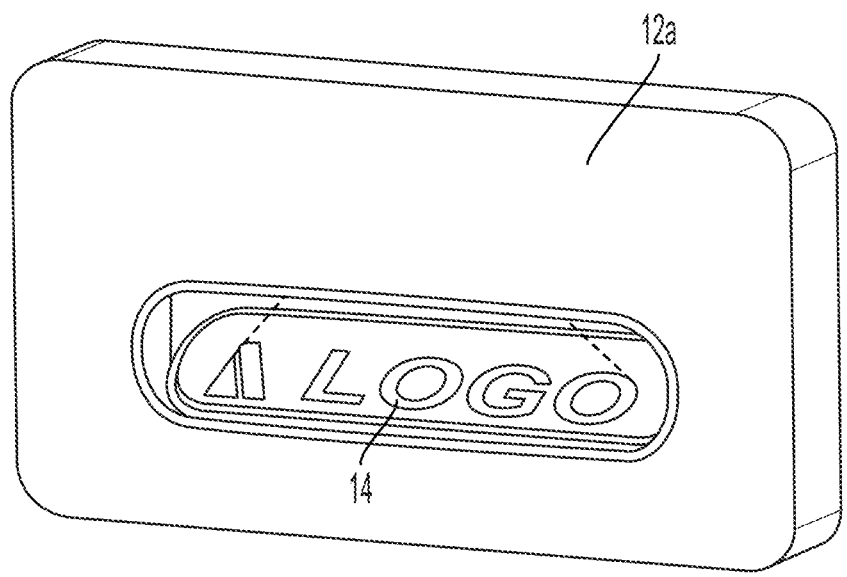
FIG. 3 is a perspective view of the vehicular exterior door handle assembly of FIG. 2, with the handle portion in a deployed state and with a logo or icon projected onto the outer surface of the handle portion by a light projection device.

The door handle assembly comprises a flush door handle assembly, with the handle portion 14, when in a non-use or non-deployed orientation or state, having its outer surface generally flush with or co-planar with the outer surface of the door panel 12a at the exterior door handle region (see FIG. 2). When the door handle is in a deployed orientation or state, the handle portion 14 is pivoted inward or retracted into the door handle pocket region within the vehicular door, and an icon or character or logo or vehicle manufacturer name or emblem is projected onto the outer surface of the handle portion 14 (see FIG. 3) via a light projection device. The light projection device projects the icon or character responsive to the handle portion pivoting to the deployed orientation. Thus, such as responsive to detection of an authorized user (such as via a passive keyless entry system, user input at a key fob or the like), the flush door handle is powered to pivot the handle portion inward to allow the user access to the handle pocket, and an icon or character or logo or emblem is projected onto the handle for logo branding and/or illumination at the handle portion. Once the handle portion is deployed or retracted or pivoted to the deployed orientation, the user can insert his or her hand into the door handle pocket region to open the vehicular door. For example, one or more sensors disposed in the handle pocket detect presence of the hand, such as to actuate the door latch mechanism to open the door, as discussed below. Optionally, the sensors may sense movement of the user's hand to provide other functions, such as locking/unlocking the door and/or lowering/raising the windows (such as to cool a hot car or the like), as also discussed below. The door handle assembly and module and/or sensing device may utilize aspects of the assemblies and modules and devices described in U.S. Pat. Nos. 10,569,697; 10,533,350; 10,107,026 and/or 9,925,953, and/or U.S. Publication No. US-2020-0130646 and/or U.S. patent application Ser. No. 17/249,905, filed Mar. 18, 2021, now U.S. Pat. No. 11,441,338, and/or U.S. provisional application Ser. No. 63/200,220, filed Feb. 23, 2021, which are hereby incorporated herein by reference in their entireties.

Figure 4:
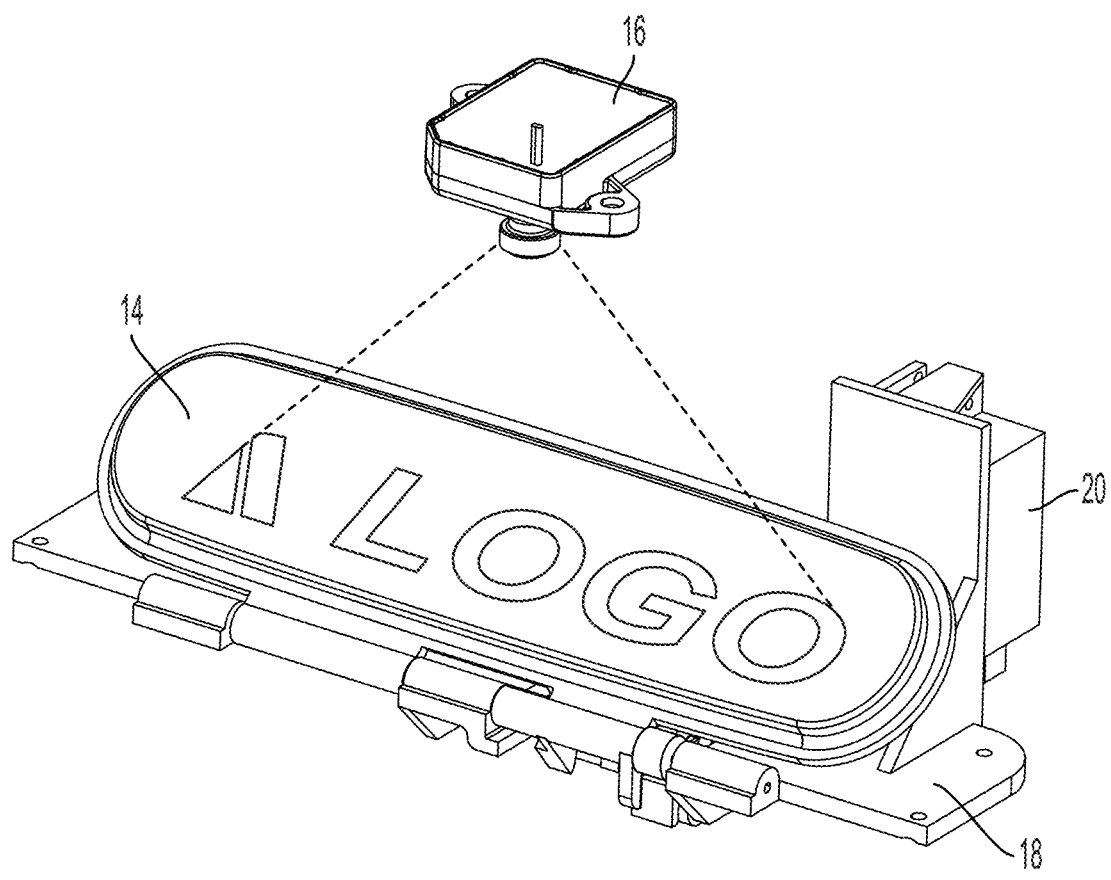
FIG. 4 is a perspective view of the door handle portion and light projection device, shown with the handle portion in its deployed state and with portions of the handle assembly removed.
Figure 5:
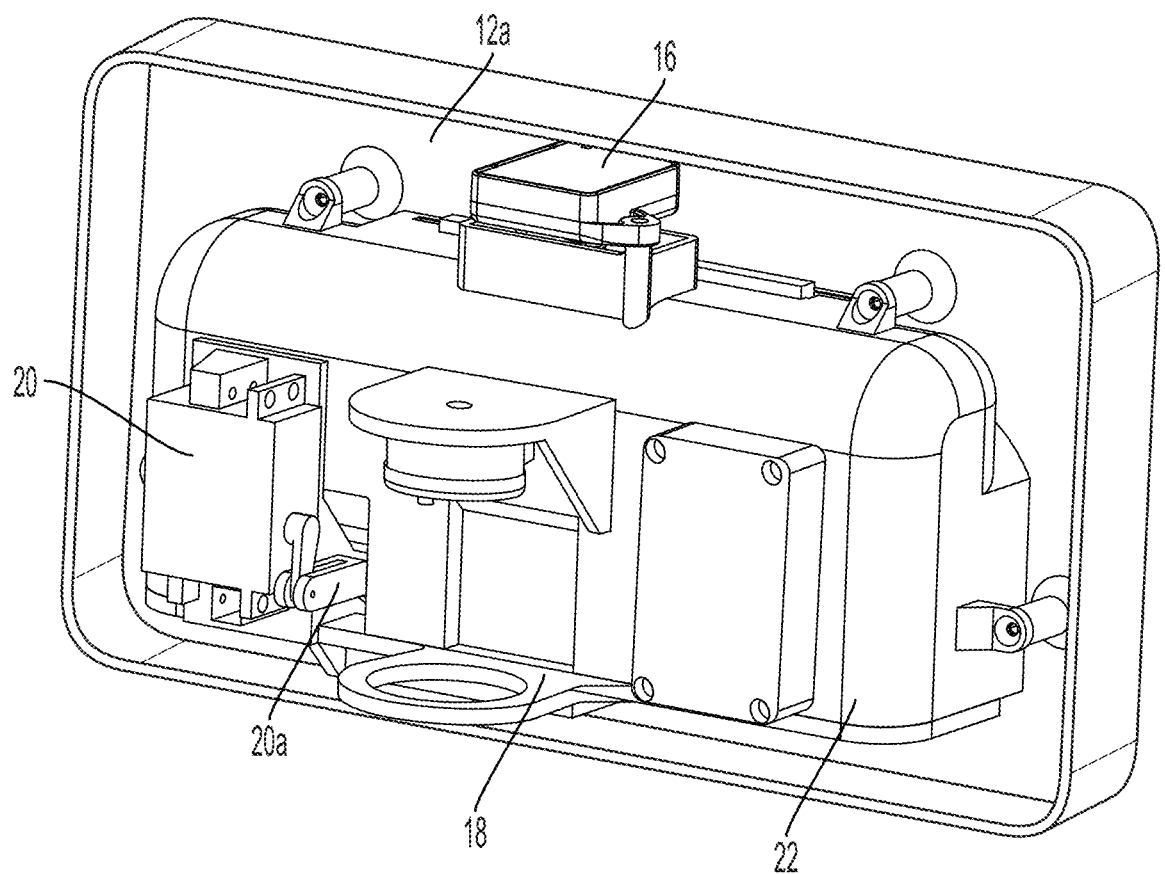
FIG. 5 is a perspective view of the vehicular exterior door handle assembly from inside the vehicle door.
Figure 6:
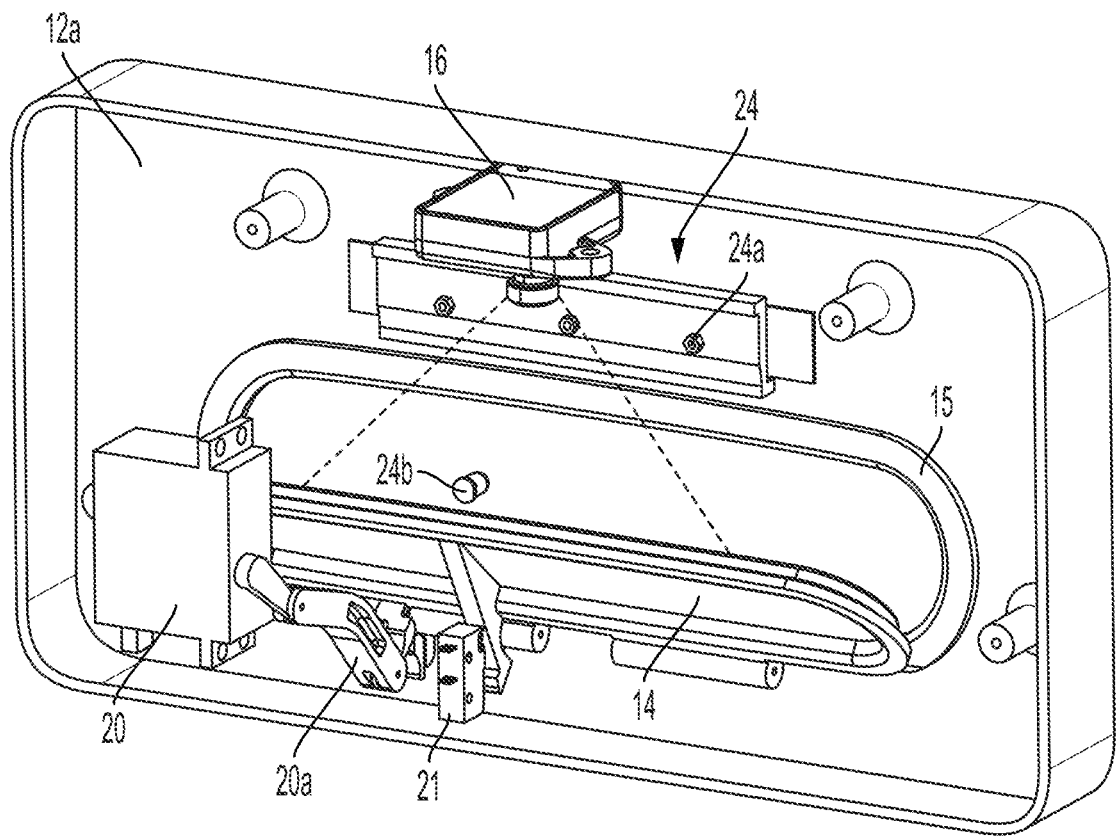
FIG. 6 is another perspective view of the vehicular exterior door handle assembly of FIG. 5, shown with the handle portion in its deployed state and with portions of the handle assembly removed.
Figure 7:
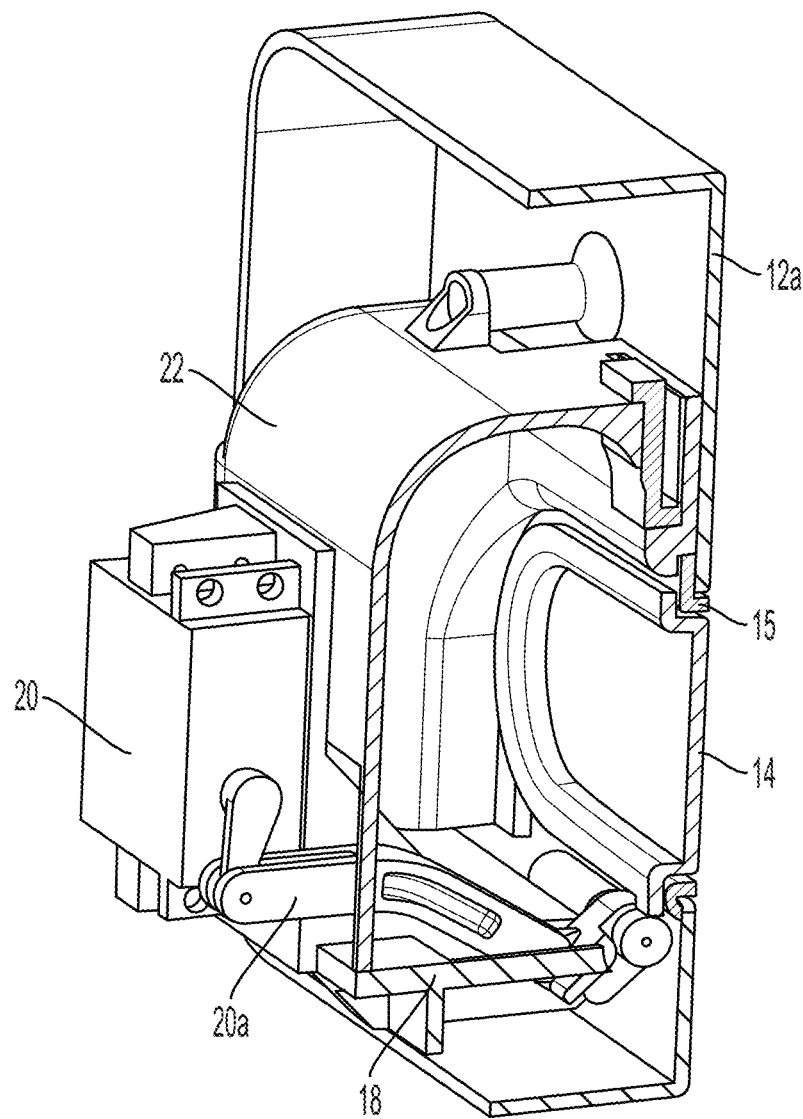
FIG. 7 is a perspective and sectional view of the vehicular exterior door handle assembly, shown with the handle portion in its flush or non-deployed state.

As shown in FIGS. 4-6, the door handle assembly 10 includes a logo projecting or light projection device or module 16 that is operable to project a logo or icon or character or illumination or the like onto the outer surface of the handle portion 14 when the handle portion is in the deployed orientation, so that a user approaching the side of the vehicle can see the handle portion and projected logo or icon. In the illustrated embodiment, the handle portion 14 is pivotally attached at a base portion or lower frame 18 of the handle assembly 10 and pivotable between a non-deployed orientation and a deployed orientation. The base portion or lower frame 18 is attached to or integrally formed with a housing or upper frame portion 22. Together, the lower frame and upper frame define a door handle pocket region of the handle assembly.

The handle portion 14 pivots about a generally horizontal pivot axis at a lower edge of the handle portion and provided by a hinge at the base portion 18 so that, when in the deployed orientation, the handle portion 14 is pivoted inward within the pocket and angled upward, and when in the non-deployed orientation, the handle portion may engage or contact and seal against a perimeter seal 15 disposed at the handle region to maintain a flush connection between the handle portion and the outer surface of the door and to limit water intrusion into the pocket when the handle is closed or in the non-deployed orientation. An upper portion of the door handle portion 14 may include a recessed or curved portion intended to receive and/or seal with a corresponding curved edge of the door panel or perimeter seal 15 when the door handle portion is in the non-deployed orientation to preclude the door handle portion from rotating beyond the flush non-deployed orientation.

The light projection device 16 is disposed at an upper portion of the vehicular exterior door handle assembly (such as at an upper inner surface of the pocket) and, with the handle portion in the deployed orientation, projects the icon or character downward onto the outer surface of the handle portion 14. Thus, when the handle portion 14 is in the deployed orientation, the handle portion 14 is pivoted inward into the pocket and the outer surface of the handle portion provides an angled surface onto which the light projection device 16 projects an image (and which is viewable by a person at the vehicle door and viewing the door handle assembly). The handle portion may be pivoted to the deployed position responsive to a recognition of an authorized user (such as via a key fob) and the light projection device may be operable responsive to the pivoting of the handle portion to the deployed position. Thus, the light projection device is in an off condition when the handle portion is in the non-deployed position and powered to an on condition when the handle portion is in the deployed position. The light projection device may include a lens or may be programmed to provide a desired icon and/or light color onto the outer surface of the handle portion. For example, the light projection device may project an icon representative of the vehicle manufacturer's logo and be programmable by a user to project a selectable color of light.

Figure 11:
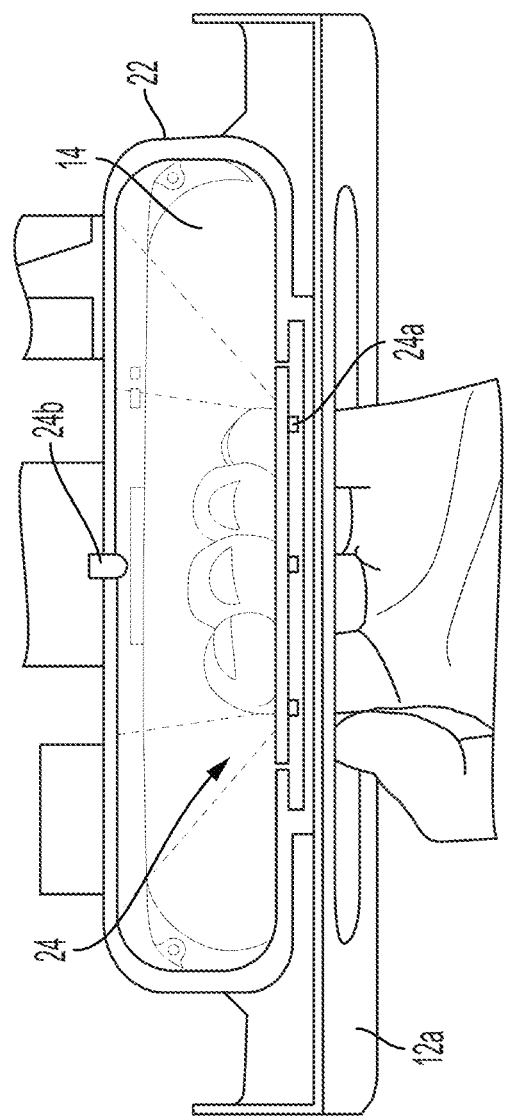
FIG. 11 is a side sectional view of the vehicular exterior door handle assembly of FIG. 10.

The handle assembly 10 includes an actuator or servo motor 20 that, responsive to input from a passive entry system or the like, pivots or actuates or moves servo links 20a to pivot the handle portion 14 relative to the base portion or frame portion 18 of the handle assembly between the non-deployed orientation and the deployed orientation. The servo motor 20 may be electrically connected to a door stop switch 21, whereby the actuator or motor stops when the door stop switch detects that the handle portion is fully deployed inward. The handle assembly 10 also includes a housing or upper frame portion 22 that defines the pocket region and provides a handle stop 22a (FIG. 11) that limits inward movement of the handle portion when in its deployed position.

For example, the servo motor 20 may, upon activation of a user input at a key fob or responsive to detecting an authorized user, operate to pivot the door handle portion 14 inward to provide a user access to the pocket region. The servo motor may pivot the door handle portion 14 until the door stop switch detects that the handle portion is pivoted a desired amount or until the handle portion contacts and is precluded from further movement by the handle stop 22a (whereby the motor may stall when load at the motor reaches a threshold level due to the handle portion hitting the handle stop). Thus, upon the servo motor 20 operating to pivot the door handle portion 14 to the deployed position, the light projecting device 16 operates to project an image downward onto the outer surface of the door handle portion 14 or otherwise illuminate the door handle pocket region for viewing by a user. The servo motor 20 is disposed at an outer or exterior rear surface of the housing 22 so that the motor and its components and servo links 20a may be fully housed within the cavity of the door panel and not exposed to environmental elements.

The handle assembly 10 also includes a pocket sensing device 24 that is operable to detect presence of the user's hand in the door handle pocket. The pocket sensing device may be any suitable sensor (such as a touch or capacitive sensor) for detecting presence of a user's hand in the pocket. In the illustrated embodiment, the pocket sensing or light sensing device 24 is operable to emit and detect light at the pocket or recess at the handle region of the vehicle door above the deployed handle portion 14, and responsive to detecting, for example, certain light patterns, operates a function of the door handle assembly. The pocket light sensing device may include a plurality of light emitters (such as light emitting diodes (LEDs) or vertical-cavity surface-emitting lasers (VCSEL) or the like) and at least one light sensor or a plurality of light sensors and at least one light emitter. In the illustrated embodiment, the pocket light sensing device 24 includes a plurality (such as three) infrared (or near infrared) light-emitting light emitting diodes (IR or near-IR LEDs) 24a that, when actuated, emit infrared light toward the back or internal rear surface of the housing or frame portion 22, where an infrared sensor 24b is disposed. The IR LEDs may be disposed at a single or common circuit element or printed circuit board (PCB) disposed partially along and above the handle portion 14 of the door handle assembly.

Figure 12:
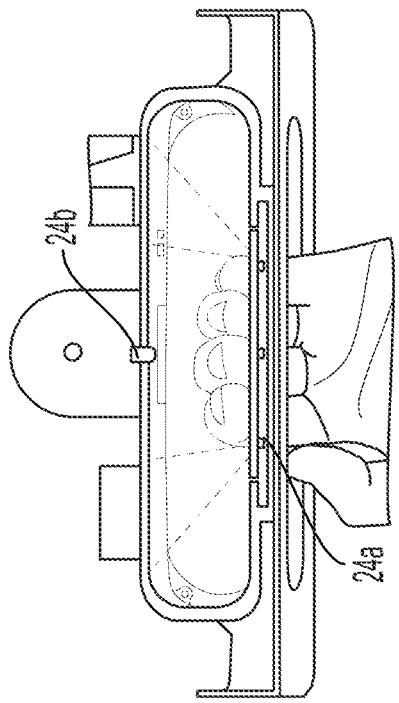
FIG. 12 is a top sectional view of the vehicular exterior door handle assembly, shown with the handle portion in its deployed state and with the infrared light emitting diodes activated to emit light.

As shown in FIG. 12, the IR LEDs are spaced apart along the PCB to provide distinguishable illumination patterns. For applications where the pocket light sensing device includes a single IR LED (or other suitable light emitter) and a plurality of light sensors, the light sensors may similarly be spaced apart to determine a difference in the light detected at the given location of the light sensor such as to sense movement within the pocket. The one or more IR LEDs may be at one side of the door handle pocket and the light sensor may be at the other side of the door handle pocket. The infrared sensor operates to sense an interruption or other difference in the light emitted by the IR light emitter(s), such as caused by the hand of a user, to detect presence of the user's hand in the pocket and/or movement of the user's hand within the pocket. Responsive to detection of presence and/or movement of the user's hand, the handle assembly activates a function of the vehicle.

Thus, the sensor 24b senses the light emitted by the IR LEDs 24a at the pocket region and determines presence of a person's hand at the pocket region and may determine motion of the hand, as discussed below. Because known capacitive sensors for passive keyless entry systems have problems with rain, latency, sensitivity, cost, and the like, the use of a light emitter and light sensor (such as at the pocket region of the vehicle door handle) provides an enhanced means for detecting presence of a person's hand at the door handle.

Figure 8:
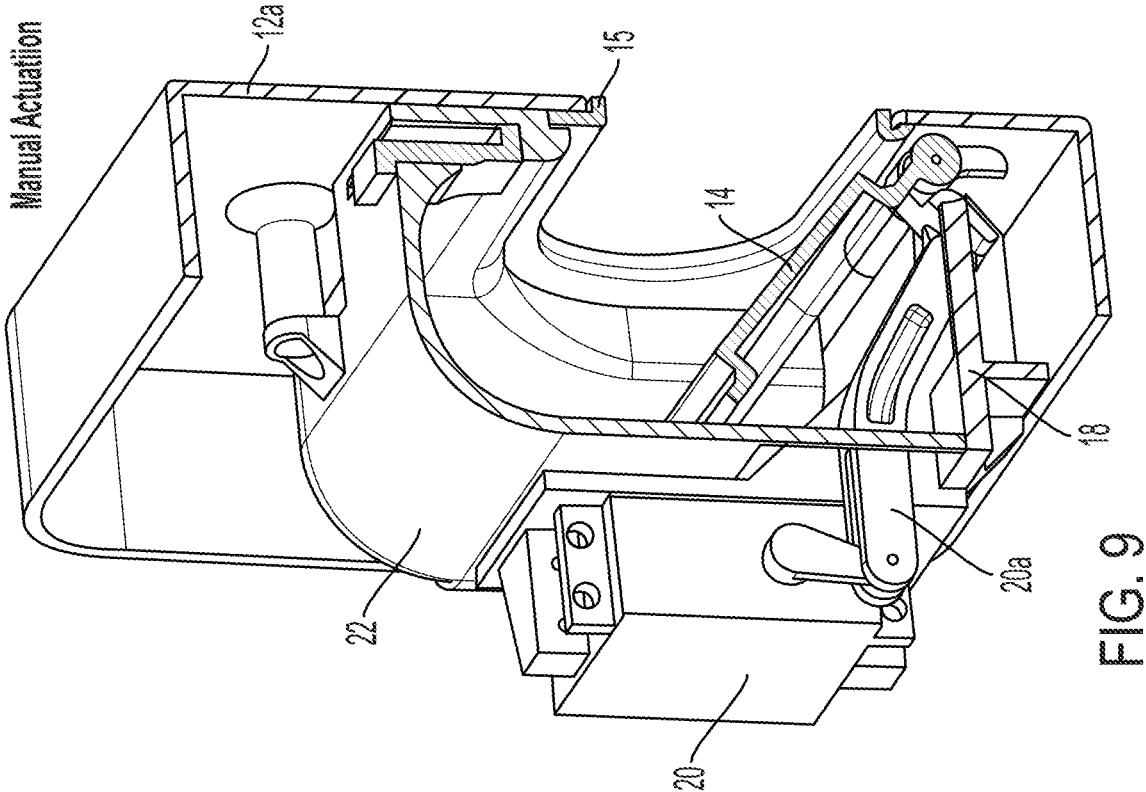
FIG. 8 is another perspective and sectional view of the vehicular exterior door handle assembly, shown with the handle portion in its deployed state as deployed via electronic actuation of the handle.
Figure 9:
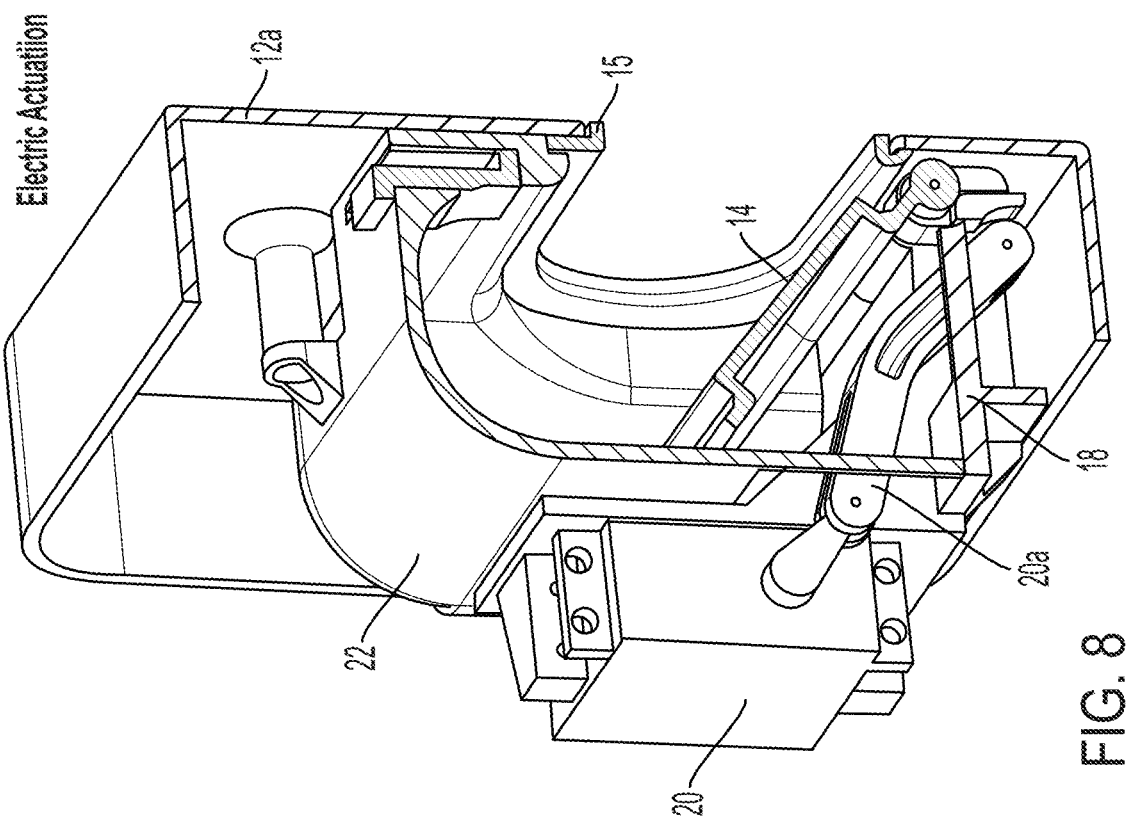
FIG. 9 is another perspective and sectional view of the handle assembly, shown with the handle portion in its deployed state as deployed via manual actuation of the handle.

Thus, and such as shown in FIG. 8, when the system detects an authorized user is approaching the side of the vehicle, the actuator or servo motor 20 operates to pivot or move the links 20a to pivot the handle portion 14 inward to its angled and recessed deployed orientation. As shown in FIG. 9, the handle portion may be manually pivoted by a user pushing on the handle portion above the pivot axis, so as to allow for manual operation of the deployable handle portion. The handle portion may be spring-loaded or biased towards its non-deployed state and may return to the non-deployed state when the user's hand is removed from the pocket region. If the servo motor 20 is operated to pivot the door handle portion to the deployed position (FIG. 8), a servo motor link 20a is rotated into contact with the biasing member at or near the pivot axis of the door handle portion so as to maintain the door handle portion in the deployed position for a determined period of time (such as until presence of the user's hand in the door handle pocket is detected or for a given period of time after presence of an authorized user is detected). The handle assembly also provides an anti-pinch design to avoid pinching the user's hand when the user pushes the handle portion to the deployed orientation.

The handle assembly may include other electronic latch triggers or sensors within the pocket, such as pressure sensors, capacitive sensors, conductive sensors, mechanical buttons or triggers and the like (for additional functions and/or as manual overrides to the pocket light sensing device) that are well protected from the external environment within the pocket. The handle portion may be triggered or deployed responsive to any suitable triggering or sensing means, such as a passive entry system, a touch at the door handle portion and/or the like to provide access to the one or more sensors via the pocket. The manual override of the powered deployment is easy and intuitive, as the user only has to press inward at the handle portion to dispose the handle portion at the deployed state, thus providing access to the door handle pocket region to activate the desired function of the door handle assembly via detection by the pocket sensing device.

The icon or logo projecting device 16 operates to project the logo downward onto the angled or deployed handle portion 14, such as responsive to pivotal movement of the handle portion or responsive to actuation of the actuator 20 or the like. Likewise, the IR LEDs 24a and the IR sensor 24b may be operated or actuated responsive to the handle portion being deployed, such as responsive to pivotal movement of the handle portion or responsive to actuation of the actuator 20 or the like. The projecting device 16 includes a lens such that the icon or character or logo, when projected downward onto the angled handle portion, is a distortion free image on the angled surface of the deployed handle portion and is projected with a generally uniform brightness or intensity at the handle portion.

The icon or character or logo may be projected as white light or may be projected in any desired or suitable color, depending on the application, with the color of the projection being different than the color of the handle portion so that the icon or logo is readily viewable at the handle portion. For example, for vehicles with the door handle portion being color-matched to the exterior color of the vehicle, the projection may be any selected color (not white) when projected onto a white door handle portion, and the projection may be white light when projected onto a colored (e.g., red, blue, black, etc.) door handle portion. For vehicle applications where the door handle portion is chrome or metallic, the projected icon or logo may be projected in any suitable color and may optionally be user-selected or customizable by the vehicle manufacturer or vehicle owner. Optionally, the color of the projected icon or logo for any vehicle application (i.e., any color of the door handle portion) may be user-selected or customizable by the vehicle manufacturer or by the vehicle owner.

Figure 10:
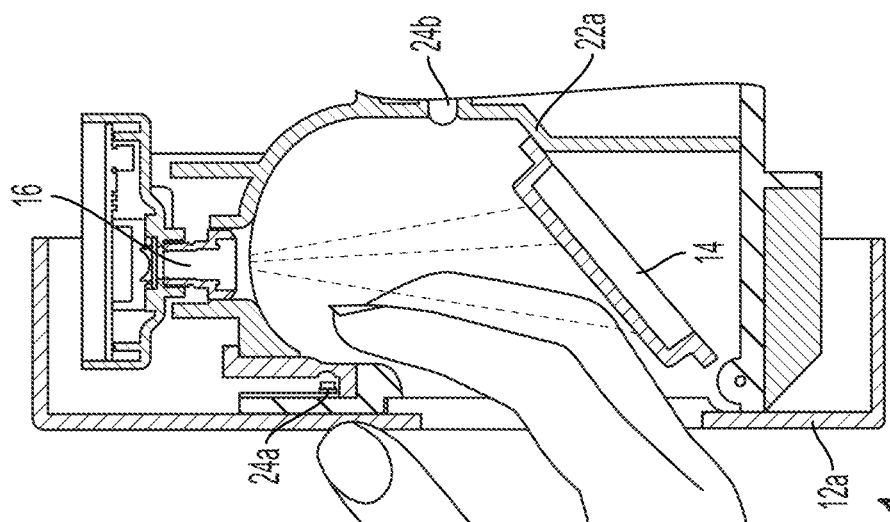
FIG. 10 is a top sectional view of the handle assembly, shown with the handle portion in its deployed state and with a user's hand received in the handle pocket.

When the handle portion is deployed (pivoted inward into the door handle pocket), the sensing device 24 operates to detect presence and movement of the user's hand in the pocket region. As can be seen with reference to FIGS. 10 and 11, the IR or near IR light emitters 24a emit light from an inner surface of the door handle pocket towards a light sensor at the opposite inner surface of the door handle pocket. The light sensor detects light emitted by the light emitters. The light emitters may each have a distinguishable light emitting pattern (such as via different wavelengths, location of the emitted light relative to the light sensor, timing of the emitted light, etc.) that is recognizable via the light sensor. The light sensor and light emitters may be synchronized so the light sensor can better recognize the light emitting pattern of the individual light emitters. The light sensor may additionally or alternatively sense and determine the illumination intensity within the door handle pocket (as described further below).

Figure 13:
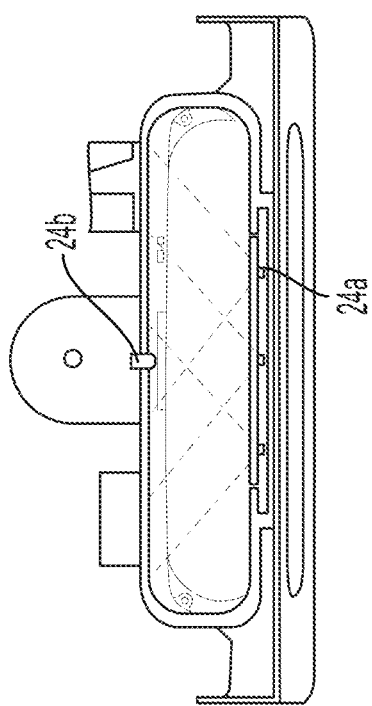
FIG. 13 is another top plan view of the handle assembly of FIG. 12, shown with a user's hand received in the handle pocket and at least partially blocking light emitted by the infrared light emitting diodes.
Figure 13A:
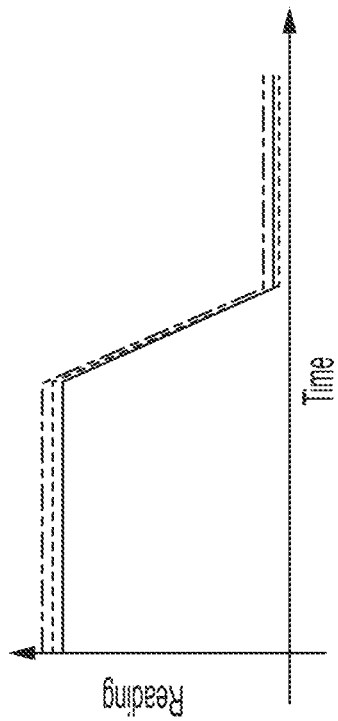
FIG. 13A is a graph showing the sensor readings of the light detecting sensor of the vehicular exterior door handle assembly when the user's hand is received in the handle pocket, measuring the intensity of the light received from each of the infrared light emitting diodes.
Figure 14:
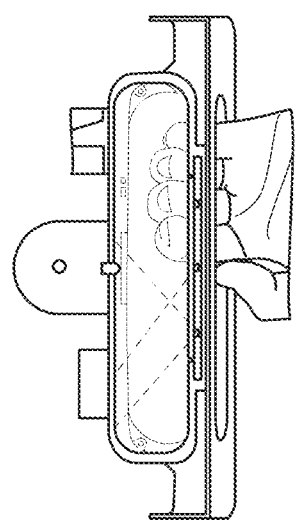
FIGS. 14-16 are top sectional views of the vehicular exterior door handle assembly of FIG. 12, shown with a user's hand moving within and along the pocket.
Figure 15:
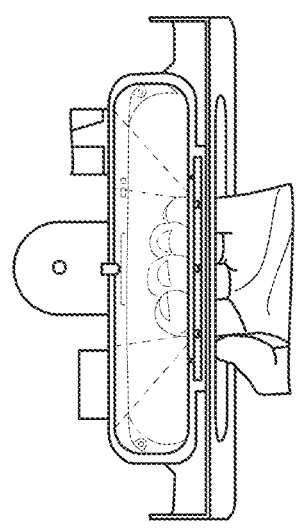
Figure 16:
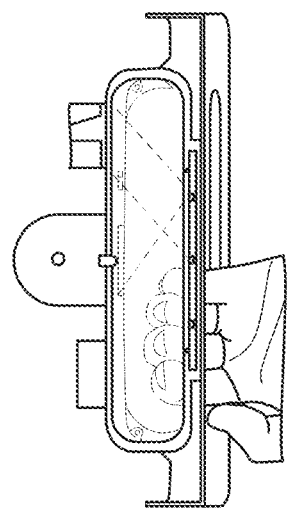

As shown, the user's hand, when in the pocket region, blocks at least a portion of the light emitted by one or more of the light emitters, such that the sensor does not sense the blocked portion of the emitted light. Responsive to detection of the user's hand in the door handle pocket (such as via a blockage of at least a portion of the light emitted by the light emitters or a reduction in the illumination intensity registered by the light sensor), the pocket sensing device 24 generates an output and the vehicular door is opened responsive to the output. The light emitters 24a may be flashed on and off in a sequential order and the data obtained from the IR sensor sensing light is synchronized with the actuation of the individual light emitters or LEDs, such that the system knows which LED or LEDs is/are fully blocked and which LED or LEDs is/are partially blocked and which LED or LEDs is/are not blocked at all. As can be seen with reference to FIGS. 12, 13 and 13A, the system may determine when and where a user's hand is present in the pocket region by the IR sensor readings over time and may generate an unlatching signal to unlatch or open the vehicle door. As shown in FIG. 13A, for example, a consistent reduction in the intensity reading at the light sensor of the light emitted by the three IR LEDs over time may reflect a constant and stationary presence of a user's hand in the pocket, thereby indicating the activation of an unlocking function.

Figure 17:
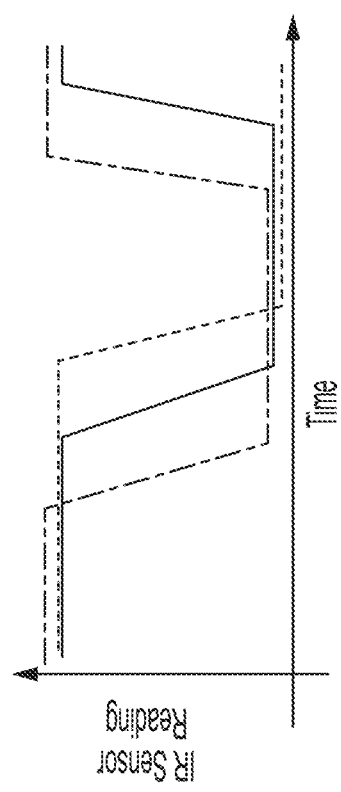
FIG. 17 is a graph showing the sensor readings of the light detecting sensor of the vehicular exterior door handle assembly when the user's hand is received in the handle pocket and moved along the pocket, measuring the intensity of the light received from each of the infrared light emitting diodes.
Figure 18:
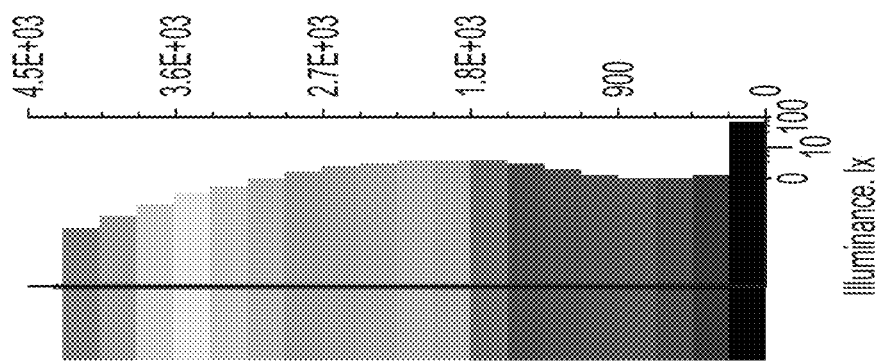
FIG. 18 is a perspective view of the vehicular exterior door handle assembly, shown with the handle portion in its deployed state, and showing illuminance levels at the handle portion.
Figure 18:
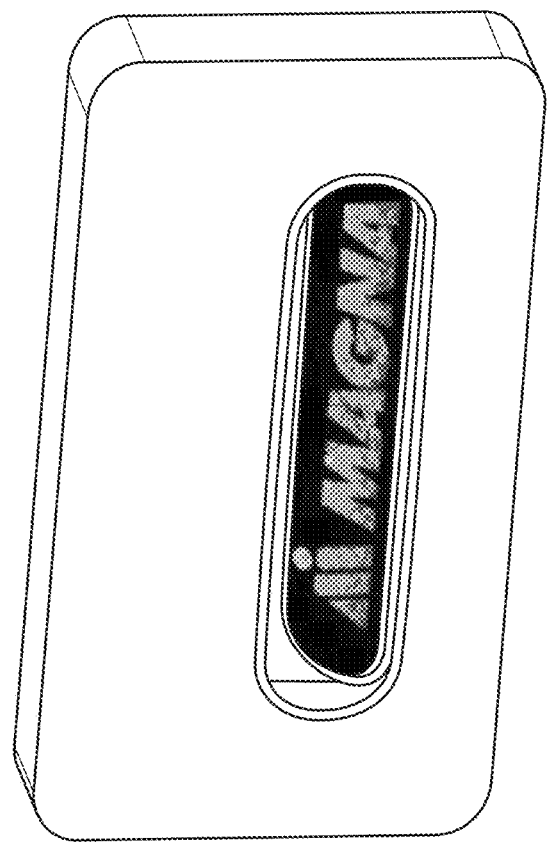

As can be seen with reference to FIGS. 14-17, the system may determine movement of the user's hand in and along the pocket region (and can determine which direction the user's hand is moving) by the individual IR sensor readings over time and may generate a signal for a corresponding function, such as to unlatch or open the vehicle door and/or lock or unlock the door and/or open or close the vehicle windows, depending on the direction of determined movement and the particular application of the door handle assembly. For example, and as shown in FIG. 17, subsequent reductions in the intensity reading at the light sensor of the light emitted by the three IR LEDs (one by one) over time may reflect a moving presence of the user's hand in the pocket, thereby triggering the activation of a corresponding function. The pocket sensing device may episodically energize individual ones of the plurality of IR LEDs to determine movement of the user's hand within the door handle pocket, such as by detecting an irregularity in the sequence of detection of the light received from the subsequently powered or energized IR LEDs. Thus, the pocket sensing device is operable to determine movement of the user's hand within the door handle pocket and operate a corresponding function responsive to the determined movement of the user's hand within the door handle pocket.

The module or system may determine the reduction in light sensed based on the level or intensity of ambient light at the door handle, and thus reduces false determinations of no hand present when ambient light is high. The module may determine presence of the hand by determining when the determined light intensity when sensing with the LED energized is at or within a threshold difference level of the determined ambient light intensity. Optionally, a threshold intensity at which presence of a hand is determined (when the LED is energized) may vary as a function of the determined ambient light level at the vehicle. In other words, the threshold intensity level at which presence of a hand is determined (when the LED is energized) may be greater for higher ambient lighting conditions (e.g., when the vehicle is outside on a sunny day) than for lower ambient lighting conditions (e.g., at nighttime). Thus, the system may episodically sense light and determine a baseline or ambient light level at any given time. When the handle is deployed, the system senses the light and processes outputs of the sensor(s) to determine light intensity at the sensor(s), and then may compare that determined light intensity with the determined ambient light level. The system may determine presence of a person's fingers at the handle based on the comparison and when the difference in light levels is at or above a threshold level or threshold change in light intensity.

In the illustrated embodiment, the IR LEDs are arranged along the length of the pocket at an inner surface of the pocket and the infrared sensor may be able to determine when a person's hand is inserted into the pocket region and may be able to determine when a person's hand is moved forward or rearward along the handle portion. Thus, for example, when the door is locked, the sensor may detect insertion of a person's hand into the pocket region (such as via a sensor reading at the infrared sensor of at least a portion of the light emitted by the IR LEDs being blocked resulting in a decrease in the light intensity reading at the sensor). If the person also is identified as an authorized user of the vehicle (such as via detection of or a signal from a remote keyless entry device or key fob or the like), the door control may unlock the door to allow the person to open the door. If the door is unlocked, the sensor may detect insertion of a person's hand into the pocket region (for example, by detecting a decrease in light intensity at one of the sensors when the LED(s) is/are energized) and a swipe of the hand along the handle region, such as rearward along the handle region (by detecting a decrease in light intensity at sequential or successive ones of the light sensors in a particular direction along the handle portion), whereby the door control performs a function such as locks the vehicle doors or opens the windows of the vehicle. Optionally, when the door is already unlocked, the system or module, responsive to determination of a swipe in the "unlocking direction" may generate a signal that results in the vehicle door being opened (such as a signal that is received at a door control module or body control module of the vehicle, which, responsive to receiving the signal, actuates a door latch mechanism to open the vehicle door). Optionally, when the door is locked, the projected icon or logo is projected with red-colored light and, when the door is unlocked, the projected icon or logo is projected with green-colored light.

Optionally, the module may use multiple sensors to detect gestures at the door handle. For example, the module may also include one or more light emitters (e.g., IR LEDs) disposed along an inner surface of the door handle pocket, and multiple light sensors may be arranged horizontally along the opposite inner surface of the door handle pocket and/or vertically to sense horizontal and/or vertical motion of a hand at the door handle pocket region. Thus, the pocket sensing device 24 may be operable to detect (such as via illumination intensity readings from known IR LEDs and/or at known light sensors over time) movement within the door handle pocket in vertical and horizontal directions to operate a wider range of functions of the door and/or vehicle. For example, the pocket sensing device may be capable of detecting, upward, downward and/or sideward movement of a user's hand within the door handle pocket.

The module, using lower cost LEDs and light sensors, may provide enhanced reliability, lower cost and added value to the door handle. Optionally, the module may emit (and detect) infrared or near infrared light that is not noticeable by the person approaching the vehicle. The module may use passive infrared emitting and/or detecting or active infrared emitting and detecting.

Although shown and described as using a plurality of light emitters or LEDs and a light sensor, any number of light emitters and light sensors may be implemented to provide the desired sensing function. For example, the sensing device may use one or more LEDs and a plurality of light sensors (e.g., three linearly arranged light sensors), with the sensors arranged so that outputs of the individual sensors can be processed to determine the location and movement of the user's hand as it passes between the LED or LEDs and the respective sensors. Optionally, the sensing by the light sensors may be episodic and synchronized with operation of the LED or LEDs so that movement of a user's hand between the LED(s) and the light sensors can be determined by processing outputs of the light sensors.

Optionally, the door handle assembly may include other sensing techniques to detect presence of the user's hand in the pocket region. For example, the door handle assembly may provide capacitive sensing, SURETOUCH™ sensing, pressure (i.e. piezoelectric) sensing, inductive sensing, or the like, and/or may provide for mechanical actuation of the door latch mechanism by the user's hand in the pocket region. The configuration of the handle locates the sensor inside the door and away from the presence of water, and thus helps to mitigate many issues associated with the likes of capacitive sensors at an exterior door handle assembly.

Optionally, the door handle assembly may be pivoted or moved to a deployed or ready state as an authorized user approaches the door of vehicle (such as responsive to a passive entry system or the like), and the user may grasp the handle portion and pivot the handle portion to open the vehicle door. For example, and with reference to FIGS. 19-27, a vehicle door handle assembly 110 includes a handle portion 114 that is pivotally mounted at a frame or base portion 118 disposed at the door and fixedly mounted at the door or to a bracket mounted to the door. The handle portion is pivotally mounted at the handle region of the vehicle door, whereby movement of the handle portion 114 by a user opens the vehicle door.

The door handle assembly 110 comprises a flush door handle assembly, with the handle portion 114, when in its non-use or non-deployed orientation (FIGS. 20 and 21), having an outer surface of the handle generally flush with or co-planar with the outer surface of the vehicular door panel at the exterior door handle region. When the door handle is at a deployed orientation (FIGS. 22-24), the handle portion 114 is rotated or pivoted to move the lower portion of the handle outward and the upper portion of the handle inward into the door handle pocket (defined by the frame 118) within the vehicular door. With the handle in the deployed orientation, a user's hand can be inserted into the pocket region (see FIG. 23) behind the lower portion of the handle, whereby a proximity or touch sensor 130 senses presence of the user's hand at the pocket region and triggers an actuator of the door handle assembly to unlatch the vehicle door. The door handle assembly has a manual override function that allows the user to manually deploy the handle portion (such as by pushing inward at an upper region of the handle portion), whereby the user can insert their hand into the pocket region and the user can further pivot (such as via pulling outward and/or upward at the handle portion) the handle portion (see FIGS. 25-27) to open the vehicle door.

Therefore, with the handle in the flush or non-deployed orientation, a user can pivot the handle to a manually deployed orientation by pushing the upper portion of the handle into the base portion. Thus, such as responsive to detection of an authorized user (such as via a passive keyless entry system or the like), the flush door handle is powered to move the lower portion of the handle portion outward to allow the user access to the handle pocket. Once the handle portion is in the deployed orientation, the user can insert his or her hand into the pocket region and the sensor can trigger opening of the door latch or the user can further pivot the handle portion, such as to actuate the door latch mechanism to open the door, as discussed below.

Figure 19:
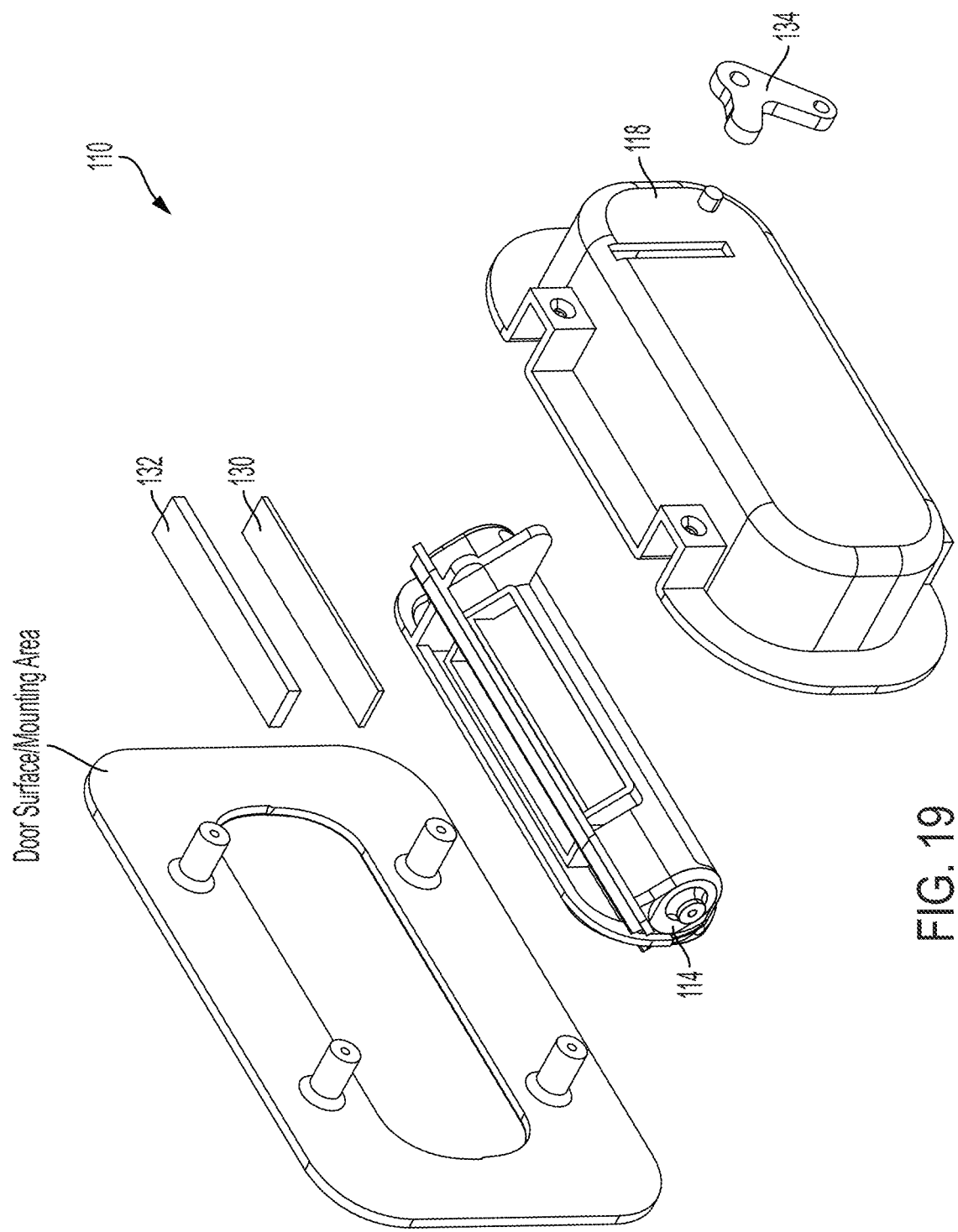
FIG. 19 is an exploded perspective view of another vehicular exterior door handle assembly, with a rotating or rolling handle portion.

In the illustrated embodiment, and as best shown in FIG. 19, the handle portion or core 114 is pivotally mounted to the handle frame or base portion 118 and within the pocket region formed by the base portion 118, such that the handle portion pivots about a horizontal pivot axis. The pivot axis is at and along a central portion of the handle between an upper portion of the handle and a lower portion of the handle so that when the handle pivots from the non-deployed orientation to the deployed orientation, the upper portion of the handle portion pivots into the pocket and the lower portion pivots outward. A sensing device includes a circuit element or circuit board 130 (such as a printed circuit board) disposed at least partially along the handle portion 114 at an upper inner surface of a recess portion and has one or more touch sensors disposed thereat or therealong.

The circuit board may be disposed within a pocket established at an inner surface of the handle portion and a potting material 132 may be disposed over the circuit board to encapsulate or seal the circuit board at the handle portion. Thus the sensing device is disposed within a recess formed along the handle above the pocket region and a potting material is disposed in the recess to encapsulate the sensing device within the recess. Electrical connection of the circuitry of the circuit board to the actuator of the door handle assembly may be made via any suitable electrical connection, such as via insert molding of electrically conductive terminals or via wires that electrically connect the circuit board 130 to the actuator at the base portion of the door handle assembly.

Figure 21:
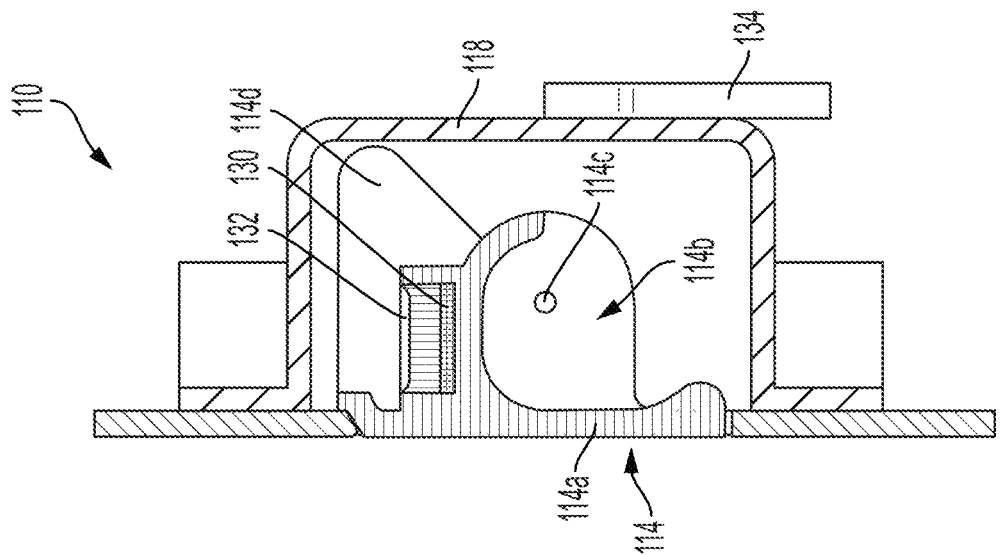
FIG. 21 is a sectional view of the vehicular exterior door handle assembly of FIG. 20.
Figure 20:
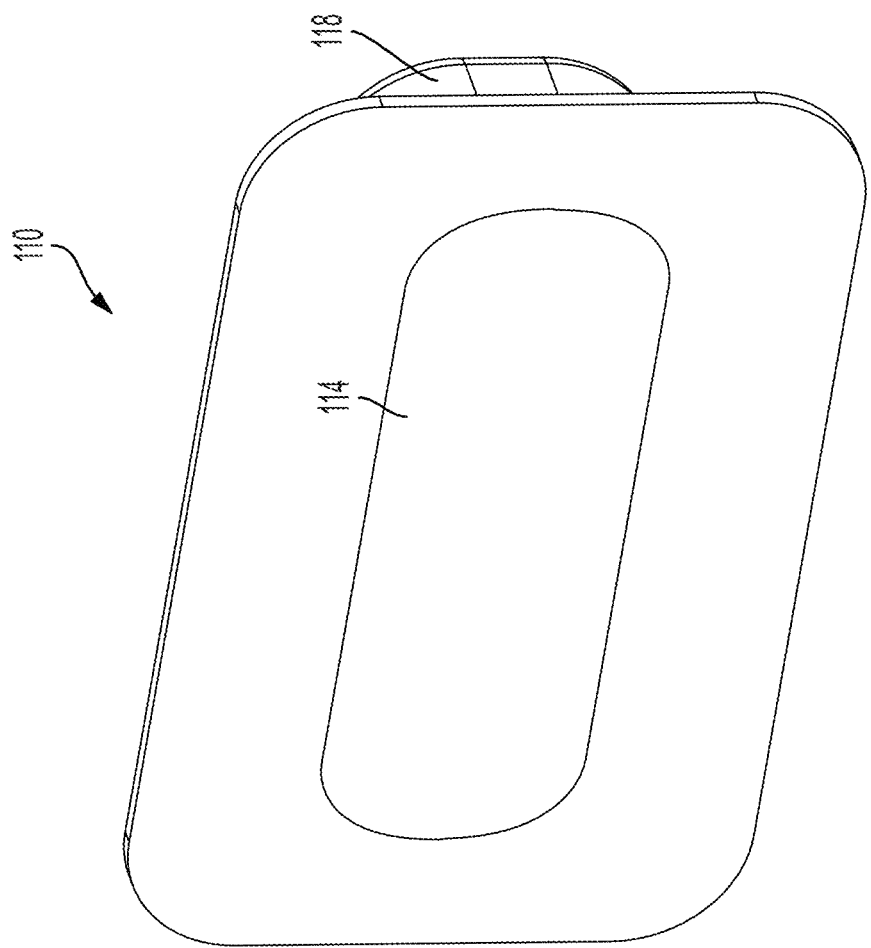
FIG. 20 is a perspective view of the vehicular exterior door handle assembly of FIG. 19, shown with the handle portion in its non-deployed state.
Figure 22:
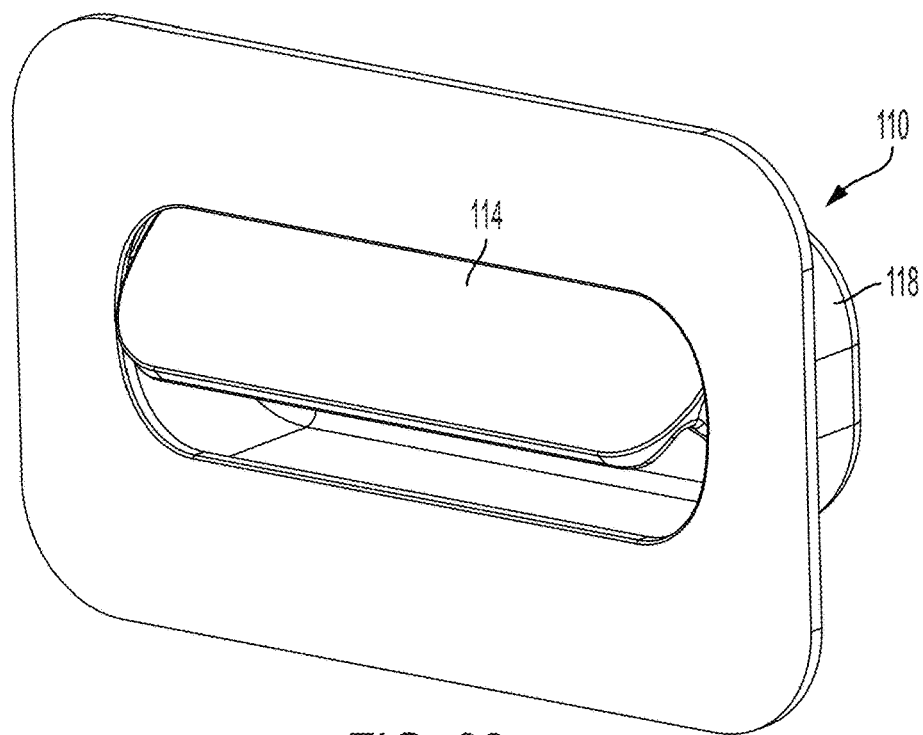
FIG. 22 is another perspective view of the vehicular exterior door handle assembly of FIG. 19, shown with the handle portion in its deployed state.
Figure 23:
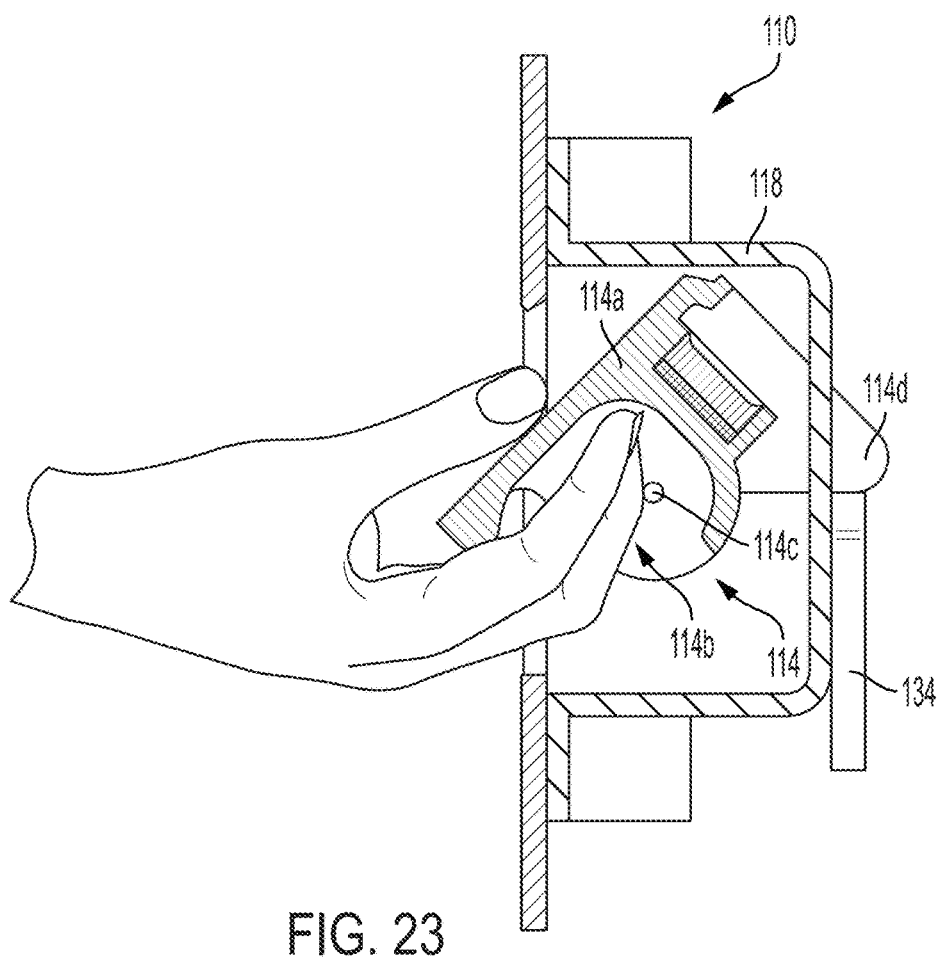
FIG. 23 is a sectional view of the vehicular exterior door handle assembly of FIG. 22, shown with a user's hand received at the recessed portion.
Figure 24:
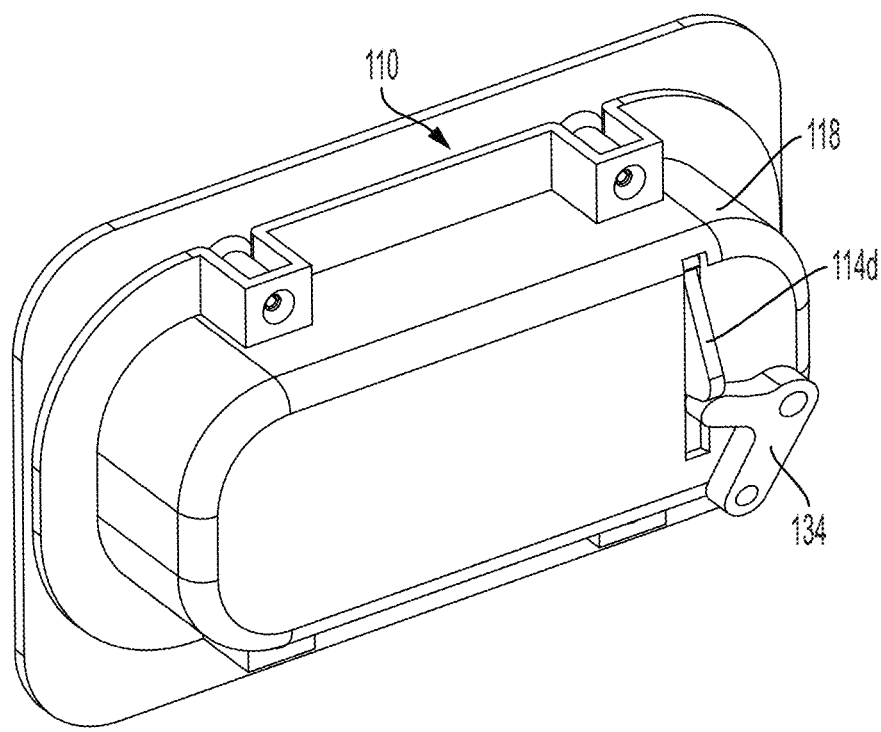
FIG. 24 is a rear perspective view of the vehicular exterior door handle assembly of FIG. 22.
Figure 25:
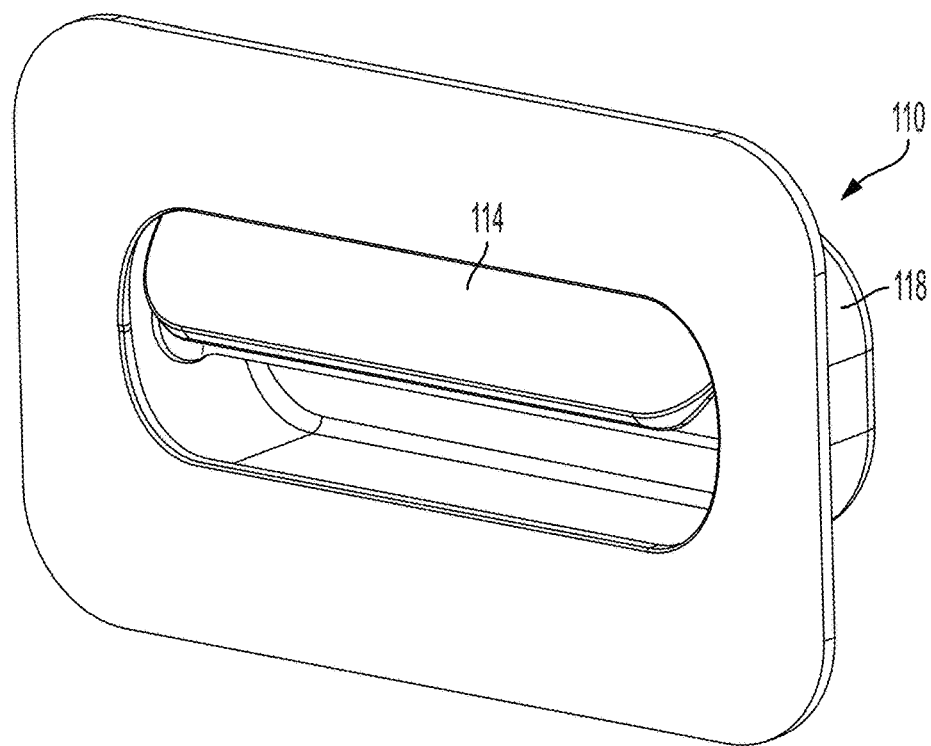
FIG. 25 is another perspective view of the vehicular exterior door handle assembly of FIG. 22, shown with the handle in its actuated state.
Figure 26:
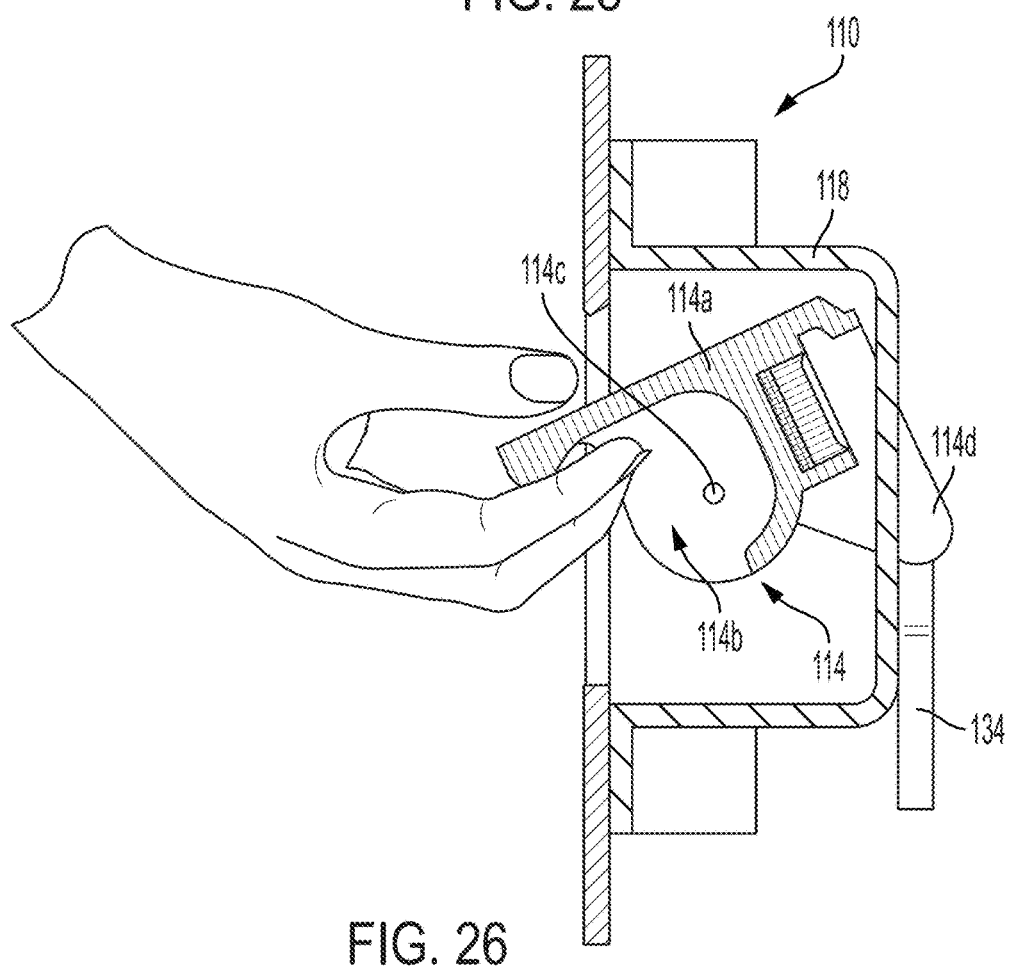
FIG. 26 is a sectional view of the vehicular exterior door handle assembly of FIG. 25.
Figure 27:
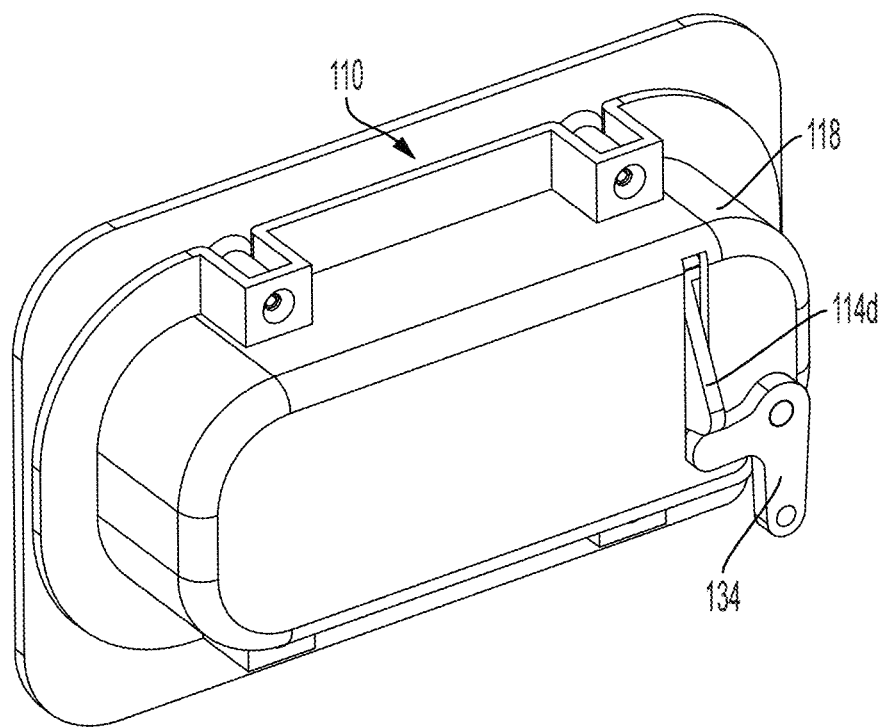
FIG. 27 is a rear perspective view of the handle assembly of FIG. 25.

As can be seen with reference to FIGS. 19 and 21, the handle portion 114 includes a generally planar outer structure 114a and a pocket or recess portion 114b behind the outer structure 114a. The pivot axis 114c is generally centrally disposed at the handle portion such that the handle portion, when deployed, rolls, pivots or rotates to open at the lower region (instead of pivoting from an upper or lower positioned pivot axis). The pivot axis may be along a centerline of the handle portion such that the upper portion extends upward from the pivot axis about the same amount as the lower portion extends downward from the pivot axis. The pivot axis may be spaced inward from the outer surface a sufficient amount so that the handle rotates about the axis to roll the upper portion upward and into the pocket (see FIG. 23). As shown in FIG. 23, the outer panel portion of the door extends downward over a portion of the pocket and the upper outer edge of the handle is rounded or chamfered so that the upper portion of the handle rolls or rotates into the space at the upper region of the pocket and behind the outer panel portion of the vehicle door when rotated into the deployed position. When in the non-deployed position, the outer structure 114a of the handle portion is substantially flush or co-planar with the outer surface of the door with the rounded or chamfered portion at the upper outer edge of the handle received at and/or behind an edge of the door panel to align the outer structure 114a of the handle portion with the outer surface of the door panel.

To enable a manual override function of the door handle assembly, the handle portion 114 includes an actuating tab or protrusion 114d that, when the handle portion is rotated about its pivot axis towards its deployed position, protrudes through a slot or opening in the base portion 118 (see FIGS. 23 and 24) to position the actuating tab 114d at a bell crank 134. Thus, when the handle portion is manually moved by the user (see FIGS. 25-27), the actuating tab 114d moves to cause the bell crank 134 to pivot, thereby actuating the latch mechanism to open the vehicle door.

The door handle assembly 110 includes an actuator (not shown in FIGS. 19-27) that imparts the pivotal movement of the handle portion to pivot or rotate or roll the handle portion from the flush or non-deployed state to the deployed state, such as responsive to a passive entry system that senses presence or approach of an authorized user at the side of the vehicle. After the actuator deploys the handle portion, the user may insert a hand into the opening of the pocket region, where the touch or proximity sensor senses presence of the hand and triggers the actuator to actuate the latch mechanism for opening the vehicle door. After the actuator has actuated the latch mechanism, the handle portion moves back to the flush position, such as via the actuator or via a return spring or biasing element.

Thus, the door handle assembly comprises a powered flush door handle with a simplified rotating design that can be used with both mechanical and e-latch systems with minimal variation in the designs. The mechanical latch system may also be used in conjunction with the e-latch system such as a manual override fail-safe or additional option for the user to actuate the latch mechanism of the door. The e-latch trigger/sensor is well protected from environment via the potting material at the recessed area of the handle portion. The device may be readily adapted to other sensing technologies (e.g., SURETOUCH™, mechanical devices, capacitive sensors, proximity sensors, etc.). The door handle assembly provides for manual override of the power deploy with a push at the upper region of the handle portion, causing the handle to rotate or roll to a partially deployed position or state. The door handle assembly provides a lower or reduced profile that reduces the cross-car packaging space to around 40 mm or less, while being compliant with a 30 G crash condition.

The handle assembly 110 thus includes an actuator or servo motor that, responsive to input from a passive entry system or the like, pivots the handle portion 114 relative to the base portion or frame portion 118 of the handle assembly. The handle portion may be spring-loaded or biased towards its non-deployed state and may return to the non-deployed state when the user's hand is removed from the pocket region. The handle assembly also provides an anti-pinch design to avoid pinching the user's hand when the user pushes the handle portion to the deployed orientation. The system may determine presence of the user's hand in and along the pocket region and may actuate the door latch mechanism to open the vehicle door. Optionally, the system may determine movement of the user's hand in and along the pocket region (and may be operable to determine which direction the user's hand is moving) by the individual sensor readings over time and may generate an unlatching signal to unlatch or open the vehicle door and/or may lock or unlock the door and/or may open or close the vehicle windows, depending on the direction of determined movement and the particular application of the door handle assembly.

The door handle assembly and light emitting and detecting modules or devices may utilize aspects of the assemblies described in U.S. Pat. No. 10,569,697, which is hereby incorporated herein by reference in its entirety. The door handle assembly may comprise any suitable type of door handle assembly, and may include or incorporate aspects of the door handle assemblies and lighting devices described in U.S. Pat. Nos. 6,349,450; 6,550,103; 6,907,643; 7,407,203; 8,333,492; 8,786,401 and/or 8,801,245, and/or U.S. Publication Nos. US-2010-0088855 and/or US-2010-0007463, which are hereby incorporated herein by reference in their entireties. Although shown as a strap type handle, the handle assembly may comprise any suitable type of vehicle door handle assembly, such as a paddle type vehicle door handle assembly (having a paddle or the like that may be pulled at to open the vehicle door) or other type of vehicle door handle assembly.

Optionally, the door handle assembly may comprise a flush door handle assembly (such as of the types described in U.S. Pat. No. 8,786,401 and/or U.S. Publication No. US-2020-0102773, which are hereby incorporated herein by reference in their entireties), whereby the lighting and sensing module may actuate to illuminate the handle portion and may also emit light through the handle portion or around the handle portion. Optionally, the door handle assembly may include a soft touch handle portion, such as utilizing the principles described in U.S. Pat. Nos. 6,349,450; 6,550,103 and/or 6,907,643, which are hereby incorporated herein by reference in their entireties The door handle assembly may also be operable in conjunction with a passive keyless entry or other sensing system that is operable to determine whether or not the person at the vehicle door is authorized for entry into the vehicle, and may only open the vehicle door when that system recognizes the user or key fob or transmitting device associated with the owner or authorized user of the vehicle. Optionally, the door handle assembly may be associated with or in communication with a door zone module, such as by utilizing aspects of the vehicle door systems described in U.S. Publication No. US-2010-0007463, which is hereby incorporated herein by reference in its entirety.

Optionally, the door handle assembly may include or may be associated with an antenna for receiving signals from or communicating with a remote device. For example, the antenna (such as, for example, an antenna of the types described in U.S. Pat. Nos. 9,484,626 and/or 6,977,619, which are hereby incorporated herein by reference in their entireties) may communicate a signal to the door locking system via a wire connection or the like, or wirelessly, such as via a radio frequency signal or via an infrared signal or via other wireless signaling means. Such connections can include cables, wires, fiber optic cables or the like. The communication to the locking system may be via a vehicle bus or multiplex system, such as a LIN (Local Interconnect Network) or CAN (Car or Controlled Area Network) system, such as described in U.S. Pat. Nos. 6,291,905; 6,396, 408 and/or 6,477,464, which are all hereby incorporated herein by reference in their entireties. The vehicle door may then be unlocked and/or the illumination source or sources may be activated as a person carrying a remote signaling device approaches the door handle. Optionally, other systems may be activated in response to the remote signaling device, such as vehicle lighting systems, such as interior lights, security lights or the like (such as security lights of the types disclosed in U.S. Pat. Nos. 8,764,256; 6,280,069;

6,276,821; 6,176,602; 6,152,590; 6,149,287; 6,139,172; 6,086,229; 5,938,321; 5,671,996; 5,497,305; 6,416,208 and/or 6,568,839, and/or U.S. Publication No. US-2013-0242586, all of which are hereby incorporated herein by reference in their entireties), or the vehicle ignition, or any other desired system. The door handle and/or illumination module may be in communication with other systems and/or controls of the vehicle door and/or vehicle, such as by utilizing aspects of the door systems described in U.S. Publication No. US-2010-0007463, which is hereby incorporated herein by reference in its entirety.

Optionally, the lighting and sensing module may comprise a strip light or pocket light or the like, and the door handle assembly may include a ground illumination light and/or other light or lighting element, such as a projection light or the like, such as by utilizing aspects of the door handle assemblies and lighting systems described in U.S. Pat. Nos. 5,371,659; 5,497,305; 5,669,699; 5,823,654; 6,349,450; 6,550,103; 8,786,401; 8,801,245 and/or 10,569,697, and/or U.S. Publication Nos. US-2010-0088855 and/or US-2010-0007463, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular exterior door handle assembly, the vehicular exterior door handle assembly comprising:
a base portion configured to mount at an exterior door handle region of a vehicular door;
a handle pivotable relative to the base portion;
wherein the handle, with the base portion mounted at the exterior door handle region of the vehicular door, is pivotable about a pivot axis that is at and along a central portion of the handle between an upper portion of the handle and a lower portion of the handle;
a sensing device disposed at least partially along the handle and operable to sense presence of a person's fingers in a pocket region behind the lower portion of the handle;
wherein, with the base portion mounted at the exterior door handle region of the vehicular door, the handle is pivotable between a non-deployed orientation, where an outer surface of the handle is coplanar with an outer surface of the vehicular door at the exterior door handle region, and a deployed orientation, where the lower portion of the handle is outward of the outer surface of the vehicular door at the exterior door handle region and the upper portion of the handle is in the pocket region within the vehicular door;
wherein, with the handle in the deployed orientation, the person's fingers are inserted into the pocket region at the lower portion of the handle;
wherein, with the base portion mounted at the exterior door handle region of the vehicular door, and with the handle in the deployed orientation and when the person's fingers are inserted into the pocket region, the sensing device senses presence of the person's fingers at the pocket region and triggers an actuator of the vehicular exterior door handle assembly to unlatch the vehicular door;
wherein, with the handle in the non-deployed orientation, the person manually pivots the handle to the deployed orientation by pushing the upper portion of the handle into the pocket region; and
wherein, with the handle in the deployed orientation, the person pulls at the lower portion of the handle to pivot the handle to open the vehicular door.

2. The vehicular exterior door handle assembly of claim 1, wherein the sensing device is disposed within a recess formed along the handle above the pocket region, and wherein a potting material is disposed in the recess to encapsulate the sensing device within the recess.

3. The vehicular exterior door handle assembly of claim 1, wherein, responsive to detection of the person's fingers in the pocket region, the sensing device generates an output, and wherein the vehicular door is opened responsive to the output.

4. The vehicular exterior door handle assembly of claim 1, wherein the sensing device is operable to determine movement of the person's fingers within the pocket region, and wherein a corresponding function is performed responsive to the determined movement of the person's fingers within the pocket region.

5. The vehicular exterior door handle assembly of claim 4, wherein the corresponding function comprises locking or unlocking of the vehicular door.

6. The vehicular exterior door handle assembly of claim 1, wherein the sensing device comprises a plurality of light sensors and at least one light emitting diode that operate to detect presence of the person's fingers in the pocket region.

7. The vehicular exterior door handle assembly of claim 6, wherein the plurality of light sensors is at a first side of the pocket region and the at least one light emitting diode is at a second side of the pocket region facing the first side.

8. The vehicular exterior door handle assembly of claim 1, comprising a light projection device operable to project an icon onto the outer surface of the handle when the handle is in the deployed orientation.

9. The vehicular exterior door handle assembly of claim 8, wherein the light projection device projects the icon responsive to the handle pivoting to the deployed orientation.

10. The vehicular exterior door handle assembly of claim 8, wherein, with the base portion mounted at the exterior door handle region of the vehicular door, the light projection device is disposed at an upper portion of the vehicular exterior door handle assembly and, with the handle in the deployed orientation, projects the icon downward onto the handle.

11. The vehicular exterior door handle assembly of claim 8, wherein the icon comprises a vehicle logo.

12. The vehicular exterior door handle assembly of claim 1, wherein the sensing device comprises a capacitive sensor.

13. The vehicular exterior door handle assembly of claim 1, wherein the sensing device comprises a piezoelectric sensor.

14. A vehicular exterior door handle assembly, the vehicular exterior door handle assembly comprising:
a base portion configured to mount at an exterior door handle region of a vehicular door;
a handle pivotable relative to the base portion;
wherein the handle, with the base portion mounted at the exterior door handle region of the vehicular door, is pivotable about a pivot axis that is at and along a central portion of the handle between an upper portion of the handle and a lower portion of the handle;
a sensing device disposed at least partially along the handle and operable to sense presence of a person's fingers in a pocket region behind the lower portion of the handle;

wherein, with the base portion mounted at the exterior door handle region of the vehicular door, the handle is pivotable between a non-deployed orientation, where an outer surface of the handle is coplanar with an outer surface of the vehicular door at the exterior door handle region, and a deployed orientation, where the lower portion of the handle is outward of the outer surface of the vehicular door at the exterior door handle region and the upper portion of the handle is in the pocket region within the vehicular door;

wherein, with the handle in the deployed orientation, the person's fingers are inserted into the pocket region at the lower portion of the handle;

wherein, with the base portion mounted at the exterior door handle region of the vehicular door, and with the handle in the deployed orientation and when the person's fingers are inserted into the pocket region, the sensing device senses presence of the person's fingers at the pocket region and triggers an actuator of the vehicular exterior door handle assembly to unlatch the vehicular door; and wherein the sensing device comprises a plurality of light emitting diodes and at least one light sensor that detects presence of the person's fingers in the pocket region, and wherein the sensing device, via episodically energizing individual ones of the plurality of light emitting diodes, determines movement of the person's fingers within the pocket region.

15. The vehicular exterior door handle assembly of claim 14, wherein the sensing device energizes the plurality of light emitting diodes and determines, at the at least one light sensor, a level of light intensity in the pocket region to detect presence of the person's fingers in the pocket region.

16. The vehicular exterior door handle assembly of claim 15, wherein the at least one light sensor senses ambient light at the vehicular exterior door handle assembly, and wherein the sensing device determines whether the determined level of light intensity is within a threshold difference level of the sensed ambient light intensity to detect presence of the person's fingers in the pocket region.

17. The vehicular exterior door handle assembly of claim 14, wherein the plurality of light emitting diodes is at a first side of the pocket region and the at least one light sensor is at a second side of the pocket region facing the first side.

18. A vehicular exterior door handle assembly, the vehicular exterior door handle assembly comprising:
a base portion configured to mount at an exterior door handle region of a vehicular door;
a handle pivotable relative to the base portion;
wherein the handle, with the base portion mounted at the exterior door handle region of the vehicular door, is pivotable about a pivot axis that is at and along a central portion of the handle between an upper portion of the handle and a lower portion of the handle;
a sensing device disposed at least partially along the handle and operable to sense presence of a person's fingers in a pocket region behind the lower portion of the handle;
wherein, with the base portion mounted at the exterior door handle region of the vehicular door, the handle is pivotable between a non-deployed orientation, where an outer surface of the handle is coplanar with an outer surface of the vehicular door at the exterior door handle region, and a deployed orientation, where the lower portion of the handle is outward of the outer surface of the vehicular door at the exterior door handle region and the upper portion of the handle is in the pocket region within the vehicular door;

wherein, with the handle in the deployed orientation, the person's fingers are inserted into the pocket region at the lower portion of the handle;

wherein, with the base portion mounted at the exterior door handle region of the vehicular door, and with the handle in the deployed orientation and when the person's fingers are inserted into the pocket region, the sensing device senses presence of the person's fingers at the pocket region and triggers an actuator of the vehicular exterior door handle assembly to unlatch the vehicular door;

wherein the sensing device comprises a plurality of light emitting diodes and at least one light sensor that detects presence of the person's fingers in the pocket region, and wherein the sensing device, via episodically energizing individual ones of the plurality of light emitting diodes, determines movement of the person's fingers within the pocket region; and wherein a corresponding function is performed responsive to the determined movement of the person's fingers within the pocket region.

19. The vehicular exterior door handle assembly of claim 18, wherein the sensing device is disposed within a recess formed along the handle above the pocket region, and wherein a potting material is disposed in the recess to encapsulate the sensing device within the recess.

20. The vehicular exterior door handle assembly of claim 18, wherein the corresponding function comprises locking or unlocking of the vehicular door.

21. The vehicular exterior door handle assembly of claim 18, wherein the sensing device energizes the plurality of light emitting diodes and determines, at the at least one light sensor, a level of light intensity in the pocket region to detect presence of the person's fingers in the pocket region.

22. The vehicular exterior door handle assembly of claim 21, wherein the at least one light sensor senses ambient light at the vehicular exterior door handle assembly, and wherein the sensing device determines whether the determined level of light intensity is within a threshold difference level of the sensed ambient light intensity to detect presence of the person's fingers in the pocket region.

23. The vehicular exterior door handle assembly of claim 18, wherein the plurality of light emitting diodes is at a first side of the pocket region and the at least one light sensor is at a second side of the pocket region facing the first side.

24. The vehicular exterior door handle assembly of claim 18, comprising a light projection device operable to project an icon onto the outer surface of the handle when the handle is in the deployed orientation.

25. The vehicular exterior door handle assembly of claim 24, wherein the light projection device projects the icon responsive to the handle pivoting to the deployed orientation.

26. A vehicular exterior door handle assembly, the vehicular exterior door handle assembly comprising:
a base portion configured to mount at an exterior door handle region of a vehicular door;
a handle pivotable relative to the base portion;
wherein the handle, with the base portion mounted at the exterior door handle region of the vehicular door, is pivotable about a pivot axis that is at and along a central portion of the handle between an upper portion of the handle and a lower portion of the handle;

a sensing device disposed at least partially along the handle and operable to sense presence of a person's fingers in a pocket region behind the lower portion of the handle;

wherein the sensing device is disposed within a recess formed along the handle above the pocket region, and wherein a potting material is disposed in the recess to encapsulate the sensing device within the recess;

wherein, with the base portion mounted at the exterior door handle region of the vehicular door, the handle is pivotable between a non-deployed orientation, where an outer surface of the handle is coplanar with an outer surface of the vehicular door at the exterior door handle region, and a deployed orientation, where the lower portion of the handle is outward of the outer surface of the vehicular door at the exterior door handle region and the upper portion of the handle is in the pocket region within the vehicular door;

a light projection device operable to project an icon onto the outer surface of the handle when the handle is in the deployed orientation;

wherein, with the handle in the deployed orientation, the person's fingers are inserted into the pocket region at the lower portion of the handle;

wherein, with the base portion mounted at the exterior door handle region of the vehicular door, and with the handle in the deployed orientation and when the person's fingers are inserted into the pocket region, the sensing device senses presence of the person's fingers at the pocket region and triggers an actuator of the vehicular exterior door handle assembly to unlatch the vehicular door;

wherein, with the handle in the non-deployed orientation, the person manually pivots the handle to the deployed orientation by pushing the upper portion of the handle into the pocket region; and wherein, with the handle in the deployed orientation, the person pulls at the lower portion of the handle to pivot the handle to open the vehicular door.

27. The vehicular exterior door handle assembly of claim 26, wherein the sensing device is operable to determine movement of the person's fingers within the pocket region, and wherein a corresponding function is performed responsive to the determined movement of the person's fingers within the pocket region.

28. The vehicular exterior door handle assembly of claim 27, wherein the corresponding function comprises locking or unlocking of the vehicular door.

29. The vehicular exterior door handle assembly of claim 26, wherein the sensing device comprises a plurality of light sensors and at least one light emitting diode that operate to detect presence of the person's fingers in the pocket region.

30. The vehicular exterior door handle assembly of claim 29, wherein the plurality of light sensors is at a first side of the pocket region and the at least one light emitting diode is at a second side of the pocket region facing the first side.

31. The vehicular exterior door handle assembly of claim 26, wherein the light projection device projects the icon responsive to the handle pivoting to the deployed orientation.

32. The vehicular exterior door handle assembly of claim 26, wherein, with the base portion mounted at the exterior door handle region of the vehicular door, the light projection device is disposed at an upper portion of the vehicular exterior door handle assembly and, with the handle in the deployed orientation, projects the icon downward onto the handle.

33. The vehicular exterior door handle assembly of claim 26, wherein the sensing device comprises a capacitive sensor.

34. The vehicular exterior door handle assembly of claim 26, wherein the sensing device comprises a piezoelectric sensor.

* * * * *